United States Patent
Urakawa et al.

(10) Patent No.: US 10,496,346 B2
(45) Date of Patent: Dec. 3, 2019

(54) COMMUNICATION APPARATUS, CONTROL PROGRAM OF COMMUNICATION APPARATUS, AND RELAY APPARATUS PROVIDING EFFICIENT DOWNLOAD OF ELECTRONIC DATA

(71) Applicant: BROTHER KOGYO KABUSHIKI KAISHA, Nagoya-shi, Aichi-ken (JP)

(72) Inventors: Yutaka Urakawa, Nagoya (JP); Satoshi Watanabe, Nagoya (JP); Katsuaki Ito, Nagoya (JP); Hirokazu Banno, Iwakura (JP); Kazutaka Yamamoto, Nagoya (JP); Masafumi Miyazawa, Nagoya (JP); Yusuke Shimada, Inazawa (JP); Takeshi Nagasaki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/055,669

(22) Filed: Aug. 6, 2018

(65) Prior Publication Data

US 2018/0375923 A1 Dec. 27, 2018

Related U.S. Application Data

(63) Continuation of application No. 13/291,635, filed on Nov. 8, 2011, now Pat. No. 10,044,789.

(30) Foreign Application Priority Data

Nov. 8, 2010 (JP) .................................. 2010-250314

(51) Int. Cl.
*G06F 3/12* (2006.01)
*H04N 1/00* (2006.01)
*H04L 29/08* (2006.01)

(52) U.S. Cl.
CPC ............ *G06F 3/1285* (2013.01); *H04L 67/06* (2013.01); *H04L 67/2804* (2013.01); *H04L 67/2819* (2013.01); *H04N 1/00188* (2013.01)

(58) Field of Classification Search
CPC combination set(s) only.
See application file for complete search history.

(56) References Cited

U.S. PATENT DOCUMENTS 7,835,037 B2  11/2010  Koide
7,984,027 B2   7/2011  Tamura
(Continued)

FOREIGN PATENT DOCUMENTS

CN  101106631 A   1/2008
CN  101325561 A  12/2008
(Continued)

OTHER PUBLICATIONS

Office Action issued in U.S. Appl. No. 13/291,430, dated Sep. 25, 2014.
(Continued)

*Primary Examiner* — Peter K Huntsinger
(74) *Attorney, Agent, or Firm* — Merchant & Gould P.C.

(57) ABSTRACT

A communication apparatus, a control program of the communication apparatus, and a relay apparatus are provided. The communication apparatus is configured to download electronic data from a server storing a first amount or more of electronic data and to output the downloaded electronic data. The communication apparatus includes an output unit configured to output a second amount of electronic data smaller than the first amount at one time, a download information acquiring unit configured to acquire download information necessary for downloading the first amount of electronic data stored in the server, from the server, a download unit configured to download the second amount of electronic data of the first amount of electronic data from the server, using the download information acquired by the download information acquiring unit. The output unit is configured to output the electronic data downloaded by the download unit.

15 Claims, 15 Drawing Sheets

(56) References Cited

U.S. PATENT DOCUMENTS

| | | |
|---|---|---|
| 8,490,084 B1 | 7/2013 | Alford et al. |
| 2002/0100058 A1 | 7/2002 | Hirose et al. |
| 2003/0065585 A1 | 4/2003 | Satomi |
| 2004/0128669 A1 | 7/2004 | Fursi et al. |
| 2005/0166228 A1 | 7/2005 | Takatori et al. |
| 2005/0240865 A1 | 10/2005 | Atkins |
| 2007/0033192 A1 | 2/2007 | Sakoh et al. |
| 2007/0083501 A1 | 4/2007 | Pedersen et al. |
| 2007/0094258 A1 | 4/2007 | Okuzawa |
| 2007/0156708 A1 | 7/2007 | Takayama et al. |
| 2007/0185885 A1 | 8/2007 | Tamura |
| 2009/0083304 A1 | 3/2009 | Dornbach et al. |
| 2009/0198820 A1 | 8/2009 | Golla et al. |
| 2009/0307086 A1 | 12/2009 | Adams |
| 2010/0121735 A1 | 5/2010 | Shimooka |
| 2010/0245901 A1 | 9/2010 | Kitaguchi |
| 2011/0061099 A1 | 3/2011 | Jiang et al. |
| 2012/0084402 A1 | 4/2012 | Ito et al. |
| 2012/0113471 A1 | 5/2012 | Shimada et al. |

FOREIGN PATENT DOCUMENTS

| | | |
|---|---|---|
| CN | 101872309 A | 10/2010 |
| JP | 2002-073466 | 3/2002 |
| JP | 2005-269250 A | 9/2005 |
| JP | 2006-260335 A | 9/2006 |
| JP | 2007-172073 A | 7/2007 |

OTHER PUBLICATIONS

Japanese Office Action issued in JP 2010-250314, dated Feb. 12, 2014.

Chinese Office Action issued in CN 201110346857.5, dated Dec. 4, 2013.

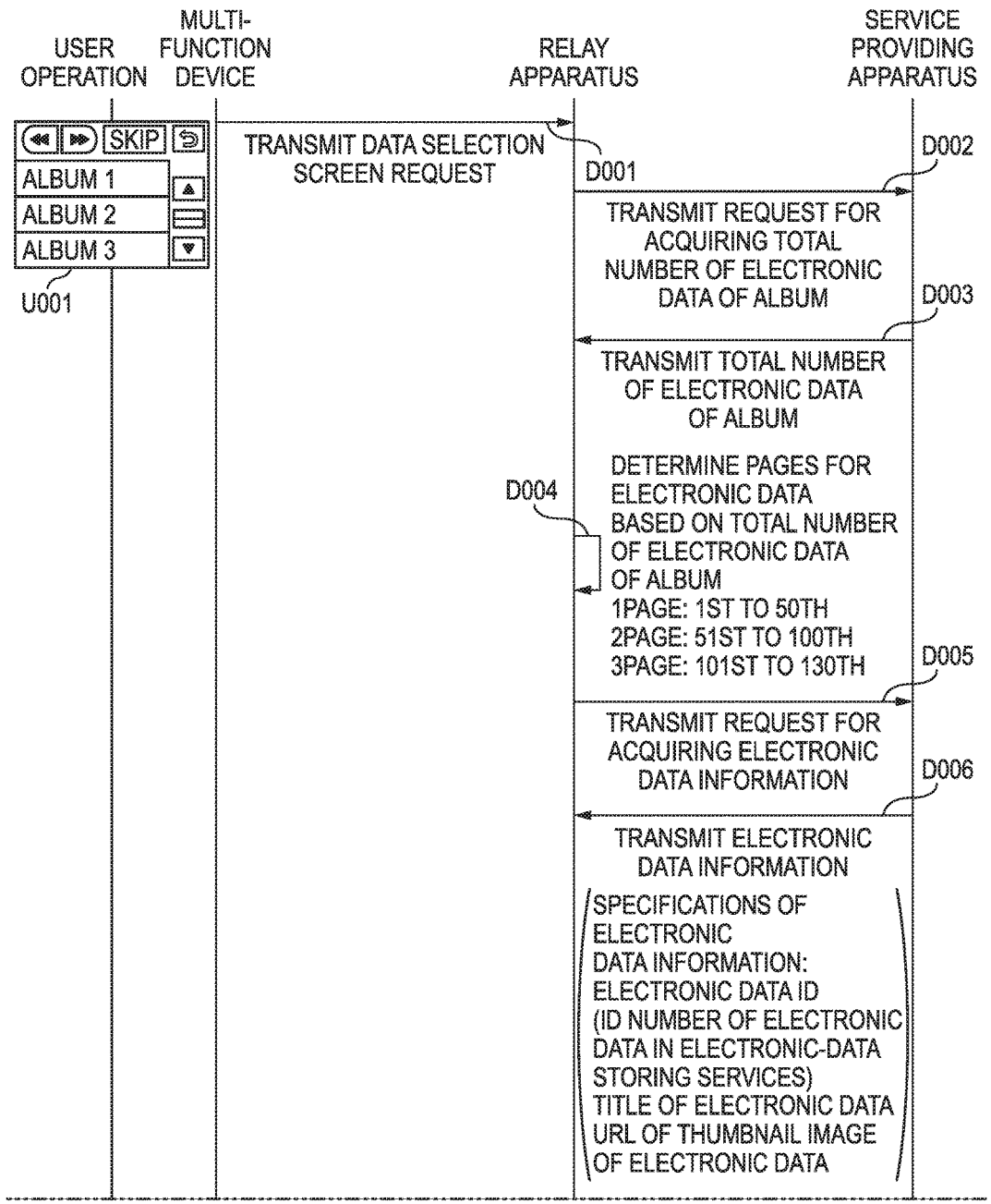

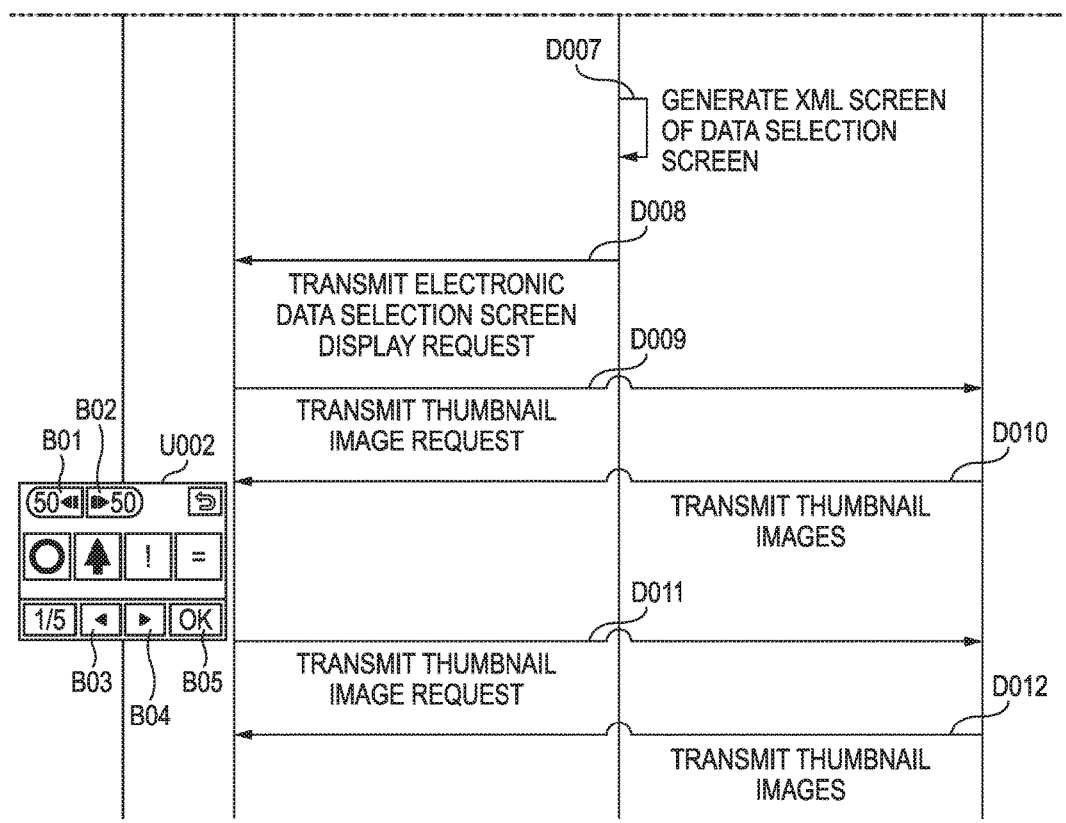

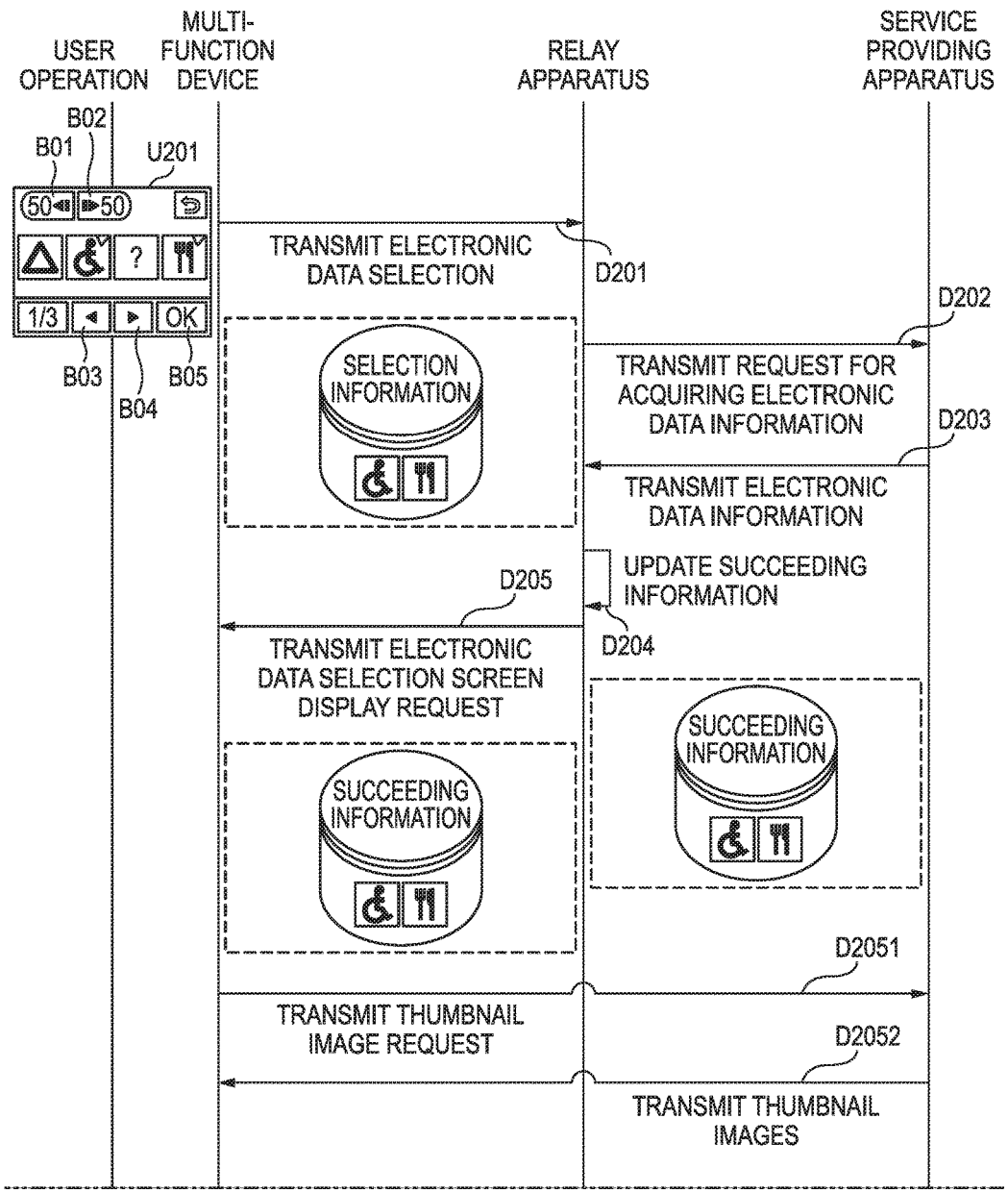

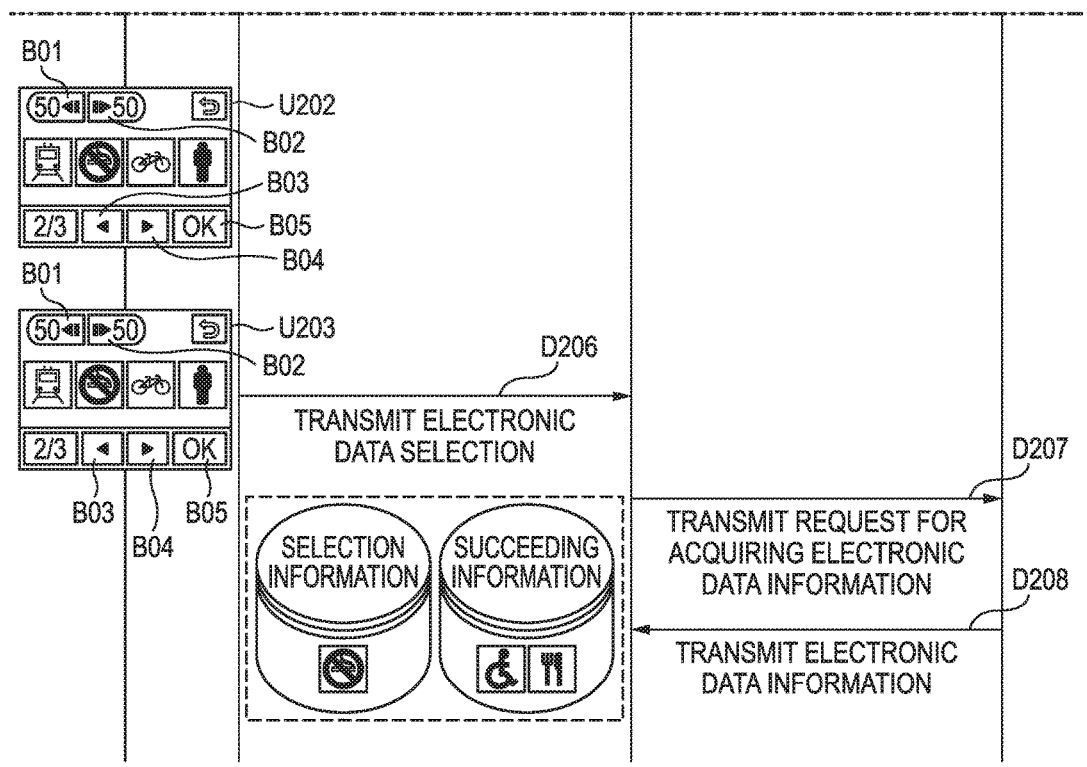

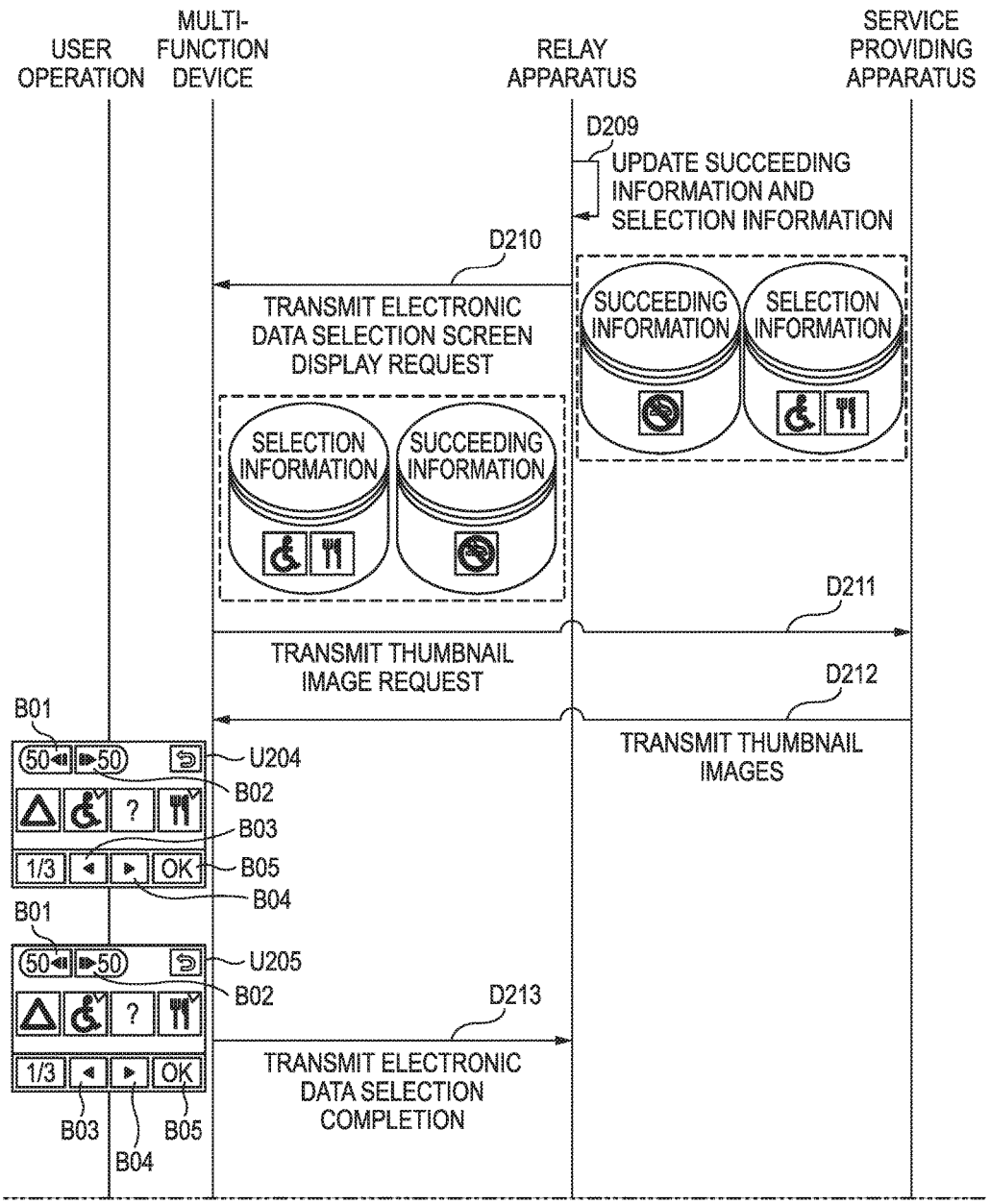

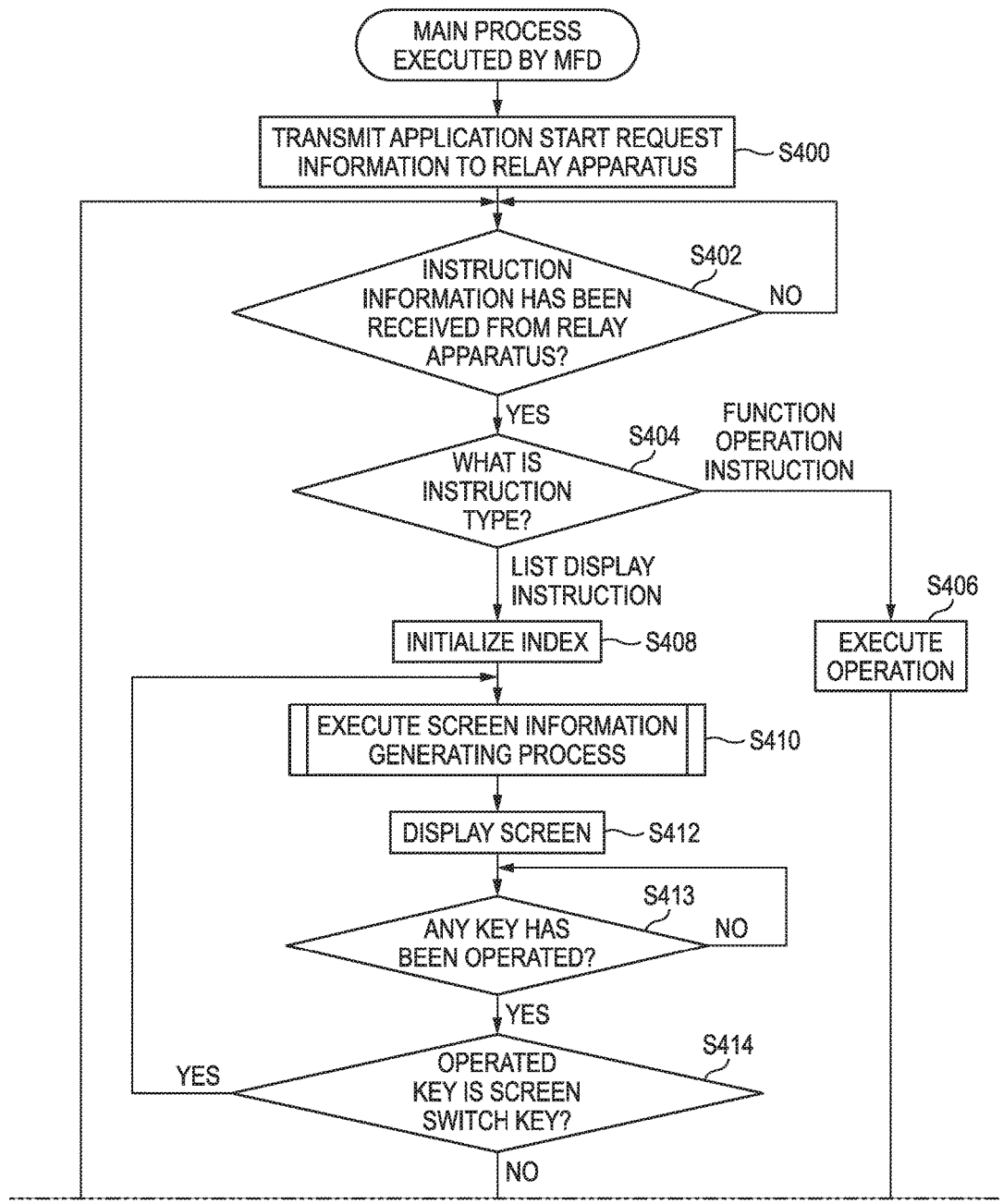

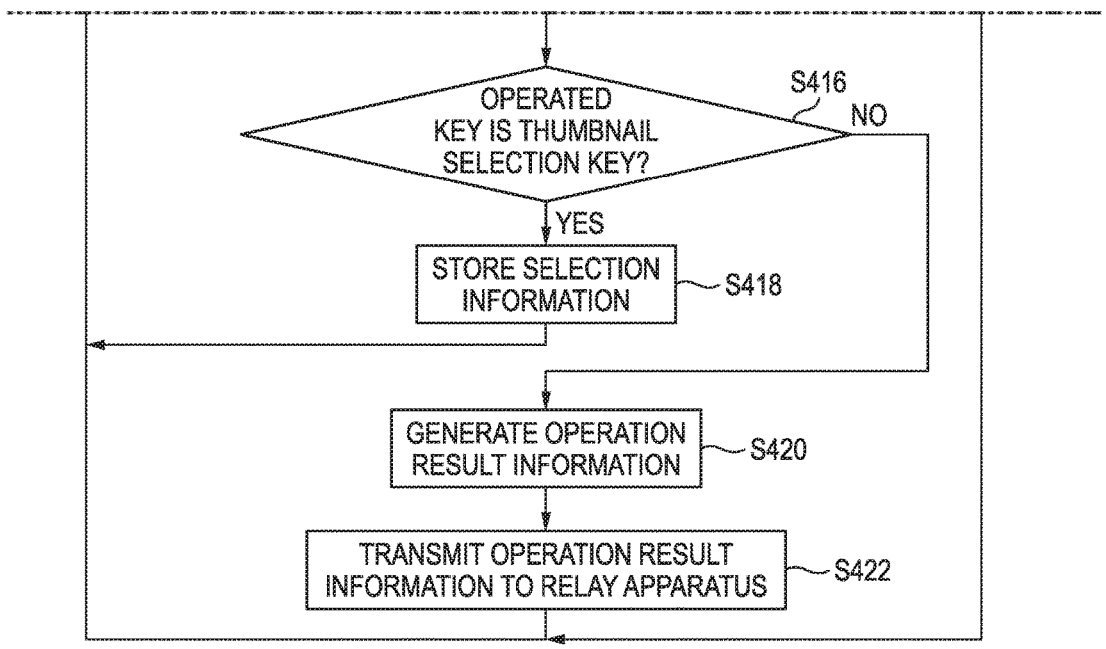

| ARRANGEMENT NUMBER | THUMBNAIL URL |
|---|---|
| 1 | FIRST URL |
| 2 | SECOND URL |
| 3 | THIRD URL |
| ⋮ | ⋮ |
| 50 | FIFTIETH URL |
| 51 | NOT EXIST |

INDEX [1] →

COMMUNICATION APPARATUS, CONTROL PROGRAM OF COMMUNICATION APPARATUS, AND RELAY APPARATUS PROVIDING EFFICIENT DOWNLOAD OF ELECTRONIC DATA

CROSS-REFERENCE TO RELATED APPLICATION

This application is a continuation of U.S. patent application Ser. No. 13/291,635, filed Nov. 8, 2011, which further claims priority from Japanese Patent Application No. 2010-250314, filed on Nov. 8, 2010, the entire subject matter of both of which is incorporated herein by reference.

TECHNICAL FIELD

Aspects of the present invention relate to a communication apparatus, a control program of the communication apparatus, and a relay apparatus.

BACKGROUND

There have been known an image reading apparatus for uploading electronic data of read images to a server, a print apparatus for printing electronic data downloaded from a server, and the like. JP-A-2005-269250 describes an example of the image reading apparatus for uploading electronic data of read images to a server. In a case of a manufacturer of such an image reading apparatus and a print apparatus providing those services, it is necessary for the manufacturer itself to provide a dedicated server for storing uploaded electronic data.

Meanwhile, recently, electronic-data storing services capable of storing electronic data in databases provided on networks by service providers become popular. For example, a Picasa (a registered trademark) web album and flickr (a registered trademark) are examples of the electronic-data storing services. Users can use a terminal device having a web browser to upload or download desired electronic data in the electronic-data storing services. Many electronic-data storing service providers release their own application program interfaces (API). Other business operators can use the APIs to provide new services cooperating with the electronic-data storing services to users.

SUMMARY

Assuming that a manufacture of a communication apparatus outputs electronic data stored in an electronic-data storing service, as part of new service cooperating with the electronic-data storing service, an amount of electronic data which a communication apparatus can output at one time is finite. For this reason, the communication apparatus receives download information for downloading a certain amount of electronic data, which can be output at one time, in the electronic-data storing service, using the APIs provided in the electronic-data storing services, downloads electronic data using the received download information, and outputs the downloaded electronic data. However, in this procedure, whenever electronic data is output, a process of receiving download information using the APIs is required, and thus a load is imposed on the communication apparatus, the electronic-data storing service, and a communication path between the communication apparatus and the electronic-data storing service.

Accordingly, an aspect of the present invention provides a communication apparatus, a control program of the communication apparatus, and a relay apparatus, capable of implementing a new service cooperating with an electronic-data storing service.

According to an illustrative embodiment of the present invention, there is provided a communication apparatus configured to download electronic data from a server storing a first amount or more of electronic data and to output the downloaded electronic data. The communication apparatus comprises: an output unit configured to output a second amount of electronic data smaller than the first amount at one time; a download information acquiring unit configured to acquire download information necessary for downloading the first amount of electronic data stored in the server, from the server; and a download unit configured to download the second amount of electronic data of the first amount of electronic data from the server, using the download information acquired by the download information acquiring unit, wherein the output unit is configured to output the electronic data downloaded by the download unit.

According to another illustrative embodiment of the present invention, there is provided a non-transitory computer-readable medium having a computer program stored thereon and readable by a computer of a communication apparatus including an output unit configured to output a second amount of electronic data smaller than a first amount of electronic data at one time, the computer program, when executed by the computer, causing the computer to perform operations comprising: acquiring download information necessary for downloading the first amount of electronic data stored in the server, from the server; downloading the second amount of electronic data of the first amount of electronic data from the server, using the acquired download information; and causing the output unit to output the downloaded electronic data.

According to a further illustrative embodiment of the present invention, there is provided a relay apparatus configured to relay communication between a server storing a first amount or more of electronic data and a communication apparatus, the communication apparatus including: a download information acquiring unit configured to acquire download information necessary for downloading the first amount of electronic data from the server; a download unit configured to download a second amount of electronic data of the first amount of electronic data from the server, using the download information acquired by the download information acquiring unit, and an output unit configured to output the second amount of data at one time, wherein the second amount of electronic data is smaller than the first amount of electronic data. The relay apparatus comprises a download information transmission unit configured, when the download information is requested by the download information acquiring unit of the communication apparatus, to request transmission of the download information from the server, to receive the download information which the server transmits, and to transmit the download information acquired from the server, to the communication apparatus.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 3 (FIGS. 3A and 3B) is a first sequence diagram view illustrating an example of the operation of the service cooperation system;

FIG. 4 (FIGS. 4A and 4B) is a second sequence diagram view illustrating the example of the operation of the service cooperation system;

FIG. 7 (FIGS. 7A and 7B) is a flow chart illustrating an operation of a multi-function device;

DETAILED DESCRIPTION

Hereinafter, illustrative embodiments of the present invention will be described with reference to the accompanying drawings. The drawings to be referred to are used for explaining technical features applicable in the present invention. Configurations of devices, apparatuses, and systems, flow charts of various processes, and the like to be described below are mere explanation examples. They are not intended to limit the scope of the present invention.

<Configuration of Service Cooperation System 10>

Figure 1:
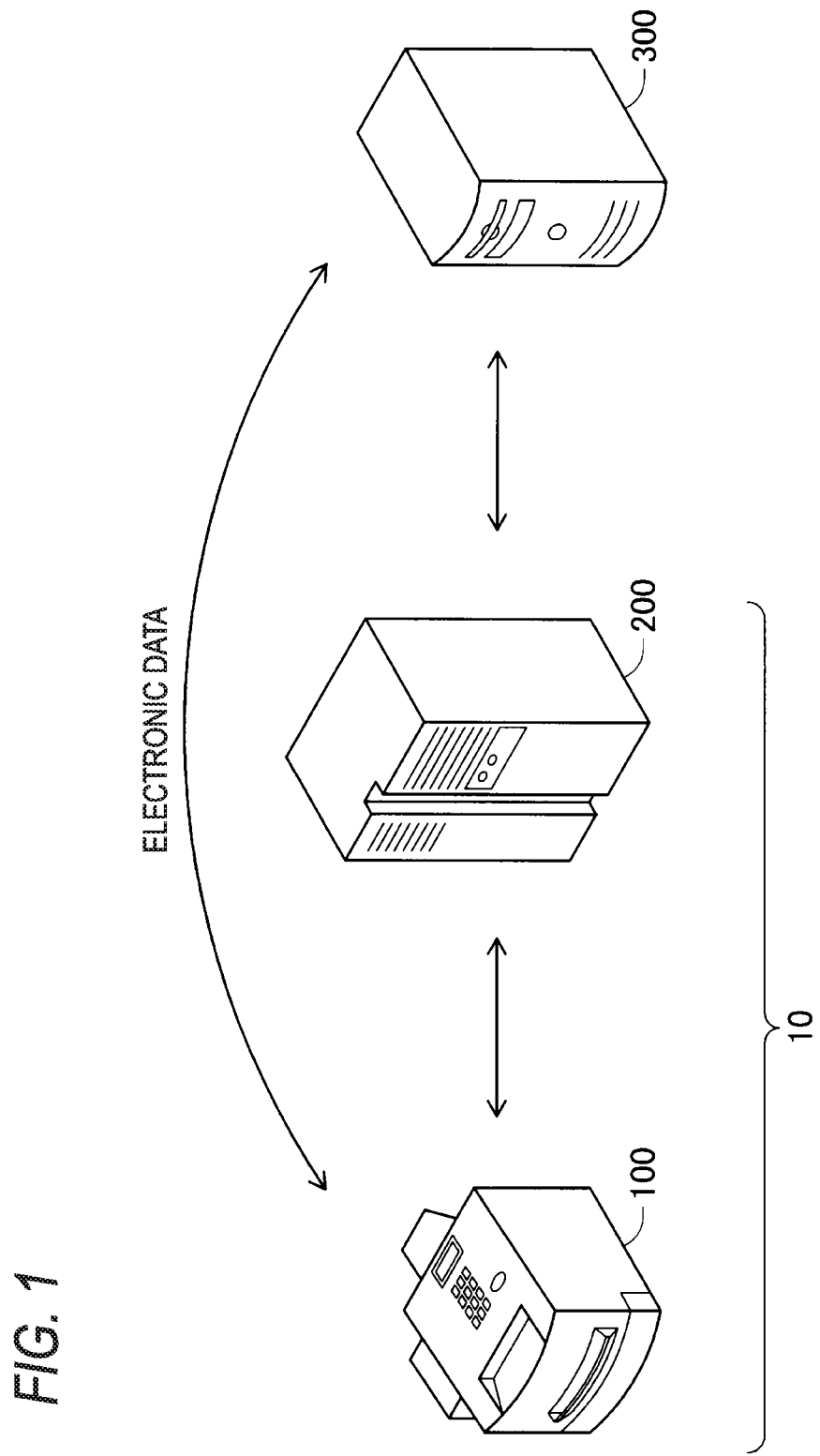
FIG. 1 is a schematic diagram illustrating a service cooperation system according to an illustrative embodiment.

A configuration of a service cooperation system 10 according to an illustrative embodiment of the present invention will be described with reference to FIG. 1. The service cooperation system 10 includes a multi-function device 100 and a relay apparatus 200. The service cooperation system 10 can upload or download electronic data or download thumbnail images of electronic data in an electronic-data storing service provided by a service provider. Herein, the electronic data may include any format file such as a Word format, a PDF format or the like in addition to image file.

The electronic-data storing service is provided by a service providing apparatus 300 installed on the Internet for each service provider. Specifically, the service providing apparatus 300 is a known web server. The service providing apparatus 300 communicates with other terminals connected to the Internet based on HTTP or HTTPS so as to provide a predetermined service to the terminals.

The multi-function device 100 is specifically a small-sized digital combined machine. The multi-function device 100 has a printing function, a scanner function, a fax function, and copy function.

A user of the multi-function device 100 can upload electronic data of an image, read by the scanner function of the multi-function device 100, in the electronic-data storing service.

Also, the user of the multi-function device 100 can display electronic data and thumbnail images of the electronic data, downloaded from the electronic-data storing service, on a display unit 150 and/or can print electronic data and thumbnail images of the electronic data, downloaded from the electronic-data storing service, by the print function of the multi-function device 100.

The multi-function device 100 uploads or downloads electronic data in cooperation with the relay apparatus 200. The multi-function device 100 acquires URLs from the electronic-data storing service through the relay apparatus 200. The URLs include an upload destination URL which is an URL of an upload destination of electronic data in the electronic-data storing service, an electronic-data URL which is a URL of electronic data to be downloaded from the electronic-data storing service, and the like. However, in order to transmit or receive binary data of a large amount of electronic data, the multi-function device 100 communicates directly with the electronic-data storing service without using the relay apparatus 200. Therefore, according to the service cooperation system 10, it is possible to suppress an amount of data passing through the relay apparatus 200. Also, it is possible to suppress a load on the relay apparatus 200.

The relay apparatus 200 may be a known apparatus having a server function. The relay apparatus 200 may also be a server owned by a manufacturer of the multi-function device 100, and it is also conceivable of using a virtual machine which is represented by Amazon EC2 (a registered trademark) and functions as a server in cooperation with a plurality of physical devices. In this case, the operational cost of the relay apparatus 200 changes according to the amount of data passing through the relay apparatus 200 and the load of processing on the relay apparatus 200. As described above, in the case where a rental server or a virtual machine is used, the operational cost of the relay apparatus 200 can be suppressed by reducing the amount of data passing through the relay apparatus 200 or reducing the load of data processing on the relay apparatus 200. Even in a case where a manufacturer by itself provides the relay apparatus 200, since the relay apparatus 200 does not need high processing performance, the equipment investment for the relay apparatus can be suppressed.

<Hardware Configuration of Service Cooperation System 10>

Figure 2:
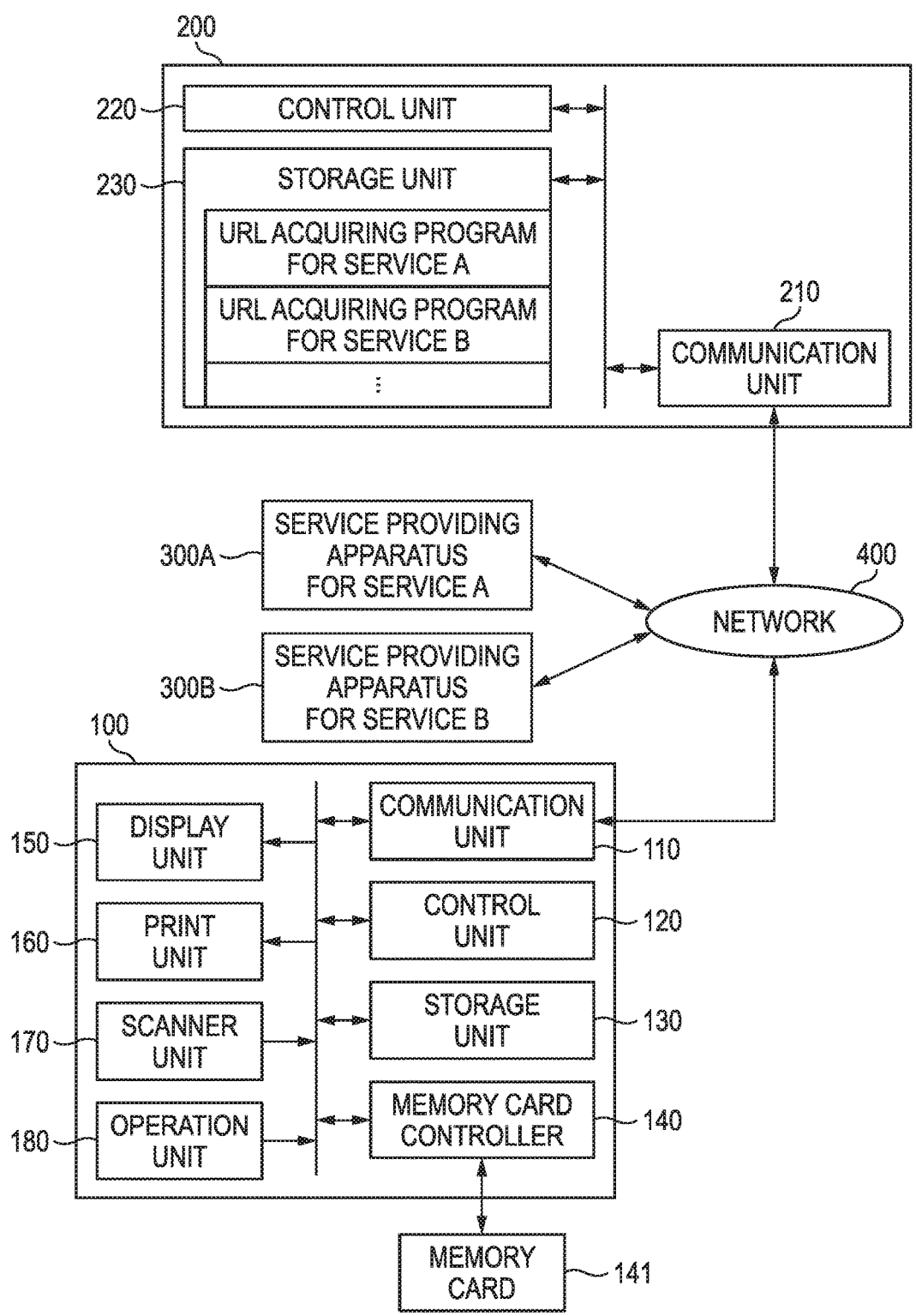
FIG. 2 is a block diagram illustrating a hardware configuration of the service cooperation system.
Figure 5B:
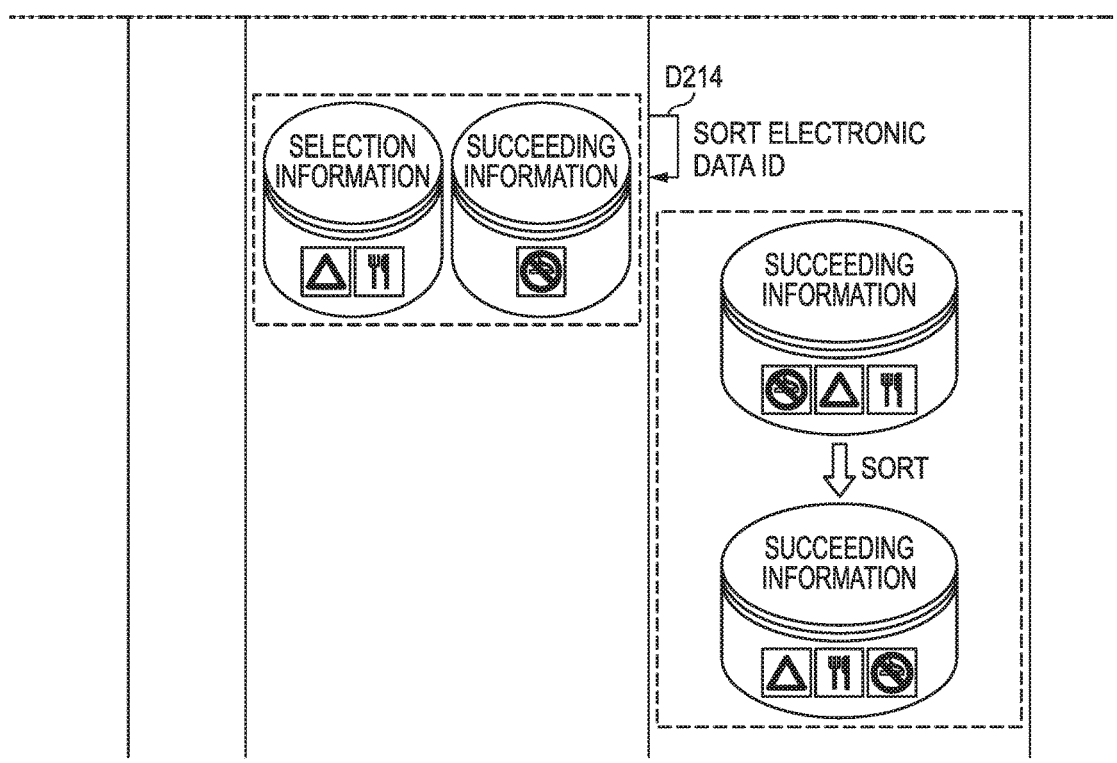
FIG. 5 (FIGS. 5A and 5B) is a third sequence diagram view illustrating the example of the operation of the service cooperation system.
Figure 6:
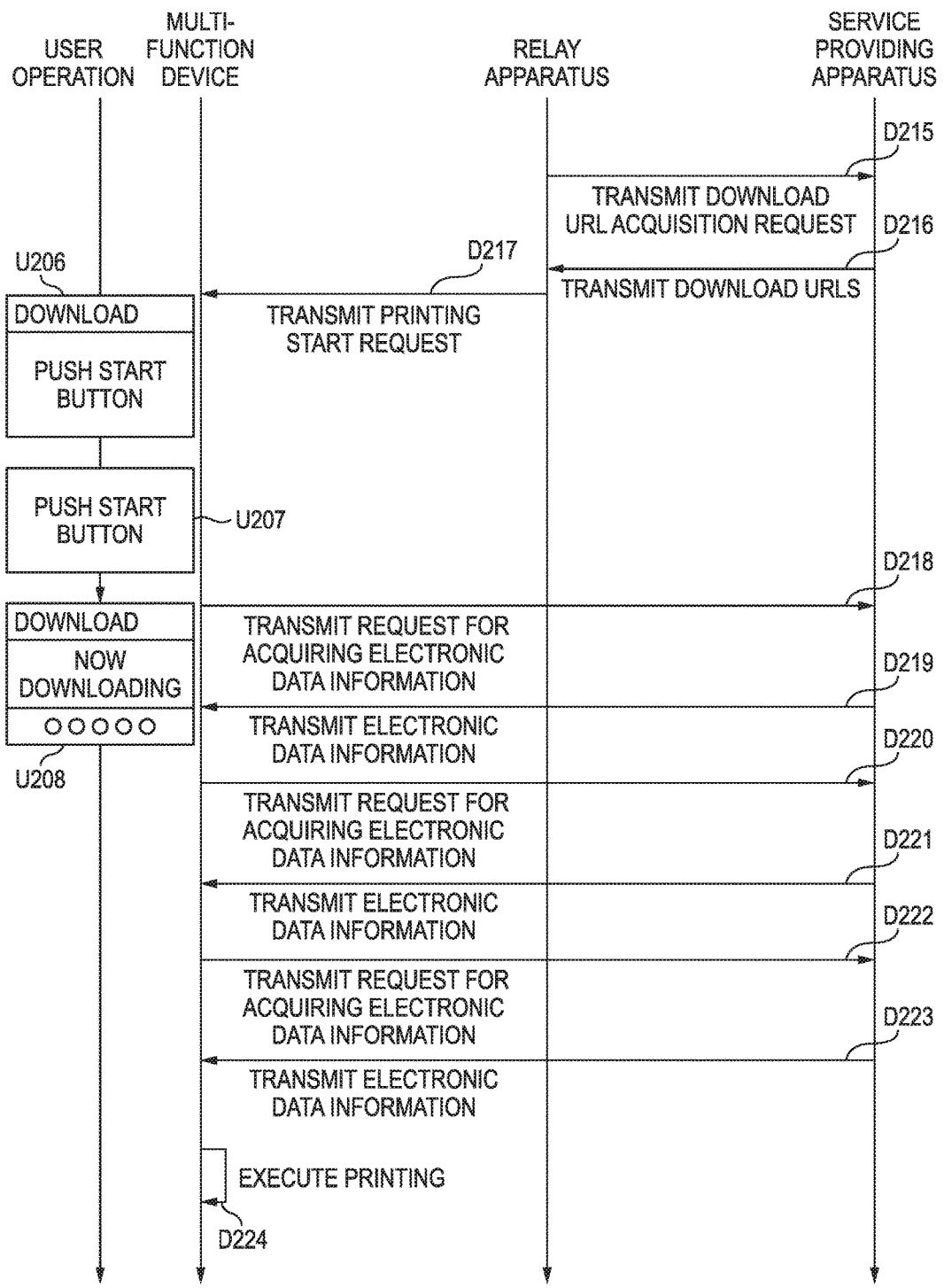
FIG. 6 is a fourth sequence diagram view illustrating the example of the operation of the service cooperation system.

A hardware configuration of the service cooperation system 10 will be described with reference to FIG. 2. The following description will be made on assumption that the service cooperation system 10 cooperates with two electronic-data storing services, that is, a service A and a service B. In the following description, a service providing apparatus 300 for the service A is referred to as a service providing apparatus 300A. Also, a service providing apparatus 300 for the service B is referred to as a service providing apparatus 300B. If it is not necessary to particularly distinguish both services from each other, the service providing apparatus 300A and the service providing apparatus 300B are generally referred to as the service providing apparatus 300. The service providing server 300 will be described as a physically existing server; however, the service providing server 300 may be a virtual machine. The multi-function device 100, the relay apparatus 200, the service providing apparatus 300A, and the service providing apparatus 300B are connected to one another through a network 400. As the network 400, for example, an Ethernet network can be used. The multi-function device 100, the relay apparatus 200, and the service providing apparatus 300 perform data transmission and reception with one another based on HTTP/1.1.

First, a software configuration of the multi-function device 100 will be described. The multi-function device 100 includes a communication unit 110, a control unit 120, a storage unit 130, a memory card controller 140, a display unit 150, a print unit 160, a scanner unit 170, and an operation unit 180.

The communication unit 110 performs communication with other devices connected to the network. As the communication unit 110, a known network card can be used.

The control unit 120 includes a CPU, and a ROM and RAM connected to the CPU (not shown). The CPU controls the operation of the multi-function device 100 according to programs stored in the ROM. The programs stored in the ROM include a rendering driver for generating a screen based on a text written in a markup language such as XML. The RAM is a storage device for temporarily storing various kinds of data.

The storage unit 130 is a non-volatile storage device such as a NAND-type flash memory. The storage unit 130 stores user identification information for identifying a user of the multi-function device 100, various set information, and the like.

The memory card controller 140 controls the memory of a memory card 141 inserted into the multi-function device 100. Specifically, the memory card controller 140 performs writing of data in the memory card 141, erasing of data stored in the memory card 141, reading of data stored in the memory card 141, or the like, according to an instruction of the control unit 120. In the memory card 141, electronic data having a predetermined format are stored. The user can store electronic data downloaded from the service providing apparatus 300 in the memory card 141.

The display unit 150 has a display such as a known LCD. The display unit 150 displays predetermined information such as a menu item selection screen (to be described below), according to an instruction form the control unit 120.

The print unit 160 prints images according to an instruction of the control unit 120.

The scanner unit 170 reads images recorded on a sheet set by a user. The scanner unit 170 reads images according to an instruction of the control unit 120.

The operation unit 180 includes a plurality of operation buttons operable by the user, and transmits signals based on the pushing operation of the user to the control unit 120. The user can input a desired instruction by operating the operation unit 180.

Next, a hardware configuration of the relay apparatus 200 will be described. The description of the present illustrative embodiment will be made on assumption that the relay apparatus 200 is a physically existing server. However, as described above, the relay apparatus 200 may be a virtual machine.

The relay apparatus 200 includes a communication unit 210, a control unit 220, and a storage unit 230.

The communication unit 210 performs communication with other devices connected to the network. As the communication unit 210, a known network card can be used.

The control unit 220 includes a CPU, and a ROM and RAM connected to the CPU (not shown). The CPU controls the operation of the relay apparatus 200 according to programs stored in the ROM and the storage unit 230. The RAM is a storage device for temporarily storing various data.

The storage unit 230 is a non-volatile storage device such as a hard disk drive. The storage unit 230 stores a plurality of software modules including a URL acquiring program for the service A and a URL acquiring program for the service B. Also, the storage unit 230 stores a relay program (not shown) for relaying communication between the multi-function device 100 and the service providing apparatus 300 in cooperation with the plurality of modules.

The URL acquiring program for the service A is for acquiring a thumbnail URL or electronic-data URL from the service providing apparatus 300A, using the API released by the service A. The thumbnail URL indicates a storage location of a thumbnail image which is displayed to enable the user to select electronic data to be downloaded.

The URL acquiring program for the service B is for acquiring a thumbnail URL or electronic-data URL from the service providing apparatus 300B, using the API released by the service B.

The user of the multi-function device 100 can designate a desired service of a plurality of electronic-data storing services. Then, the user of the multi-function device 100 can download desired electronic data in the designated service. Also, the user of the multi-function device 100 can select whether to print electronic data downloaded in the electronic-data storing service by the print unit 160 or to store the downloaded electronic data in the memory card 141 inserted in the multi-function device 100.

<Operation of Service Cooperation System 10>

Next, an example of the operation of the service cooperation system 10 will be described with reference to FIGS. 3 to 6. FIGS. 3 to 6 are sequence diagrams illustrating an example of the operation of the service cooperation system 10. In this example, a flow in a case where the user of the multi-function device 100 selects printing of electronic data downloaded in the electronic-data storing service will be described. In the following description, the electronic-data storing service is simply referred to as the service.

In the present illustrative embodiment, the number of thumbnail URLs and electronic-data identification information which can be downloaded from the service providing apparatus 300 at one time is limited to 50. The number of thumbnail URLs and electronic-data identification information which can be downloaded at one time is determined based on the processing capability of the multi-function device 100 or the relay apparatus 200, for example, during designing. The service providing apparatus 300 manages a collection of a plurality of electronic data in units of albums. For example, in the present illustrative embodiment, each album includes 130 electronic data. When the user operates the operation unit 180 of the multi-function device 100 so as to select an album including electronic data to be downloaded and a service corresponding to the album from a list of albums (album1, album2, and album3) in a data selection screen U001 (see FIG. 3) displayed on the display unit 150, the multi-function device 100 transmits a data selection screen request to the relay apparatus 200 in step D001. The data selection screen request includes service identification information for identifying the service selected by the user, and user identification information for identifying the user.

Then, in step D002, the relay apparatus 200 issues a request of acquiring a total number of electronic data included in the album, to the service providing apparatus 300. Subsequently, in step D003, the service providing apparatus 300 notifies the total number of electronic data included in the album to the relay apparatus 200. The relay apparatus 200 handles the electronic data in units of pages, each of which includes up to 50 electronic data corresponding to the number of identification information of thumbnail URLs and electronic-data identification information which can be downloaded at one time. When acquiring the total number of electronic data of the album, the relay apparatus 200 determines pages for the electronic data of the album, in step D004. In the present illustrative embodiment, since the album of the service providing apparatus 300 includes 130 electronic data, the control unit 220 of the relay apparatus 200 determines the first page for the 1st to 50th electronic data, the second page for the 51st to 100th electronic data, and the third page for the 101st to 130th electronic data. Next, in step D005, the relay apparatus 200 requests electronic data information (an electronic data ID, an electronic data title, and a thumbnail URL) regarding to each of the electronic data corresponding to a page according to a request of the multi-function device 100.

In step D005, the relay apparatus 200 can identify the service and the user based on the service identification information and the user identification information included in the data selection screen request received from the multi-function device 100. Then, the relay apparatus 200 generates an electronic data information request corresponding to the service and the user, and transmits the electronic data information request to the service providing apparatus 300. At this time, the relay apparatus 200 generates the electronic data information request according to a program based on the service designated by the user.

Specifically, when the user has designated the service A, the relay apparatus 200 generates an electronic data information request corresponding to the service A according to the URL acquiring program for the service A stored in the storage unit 230, and transmits the electronic data information request to the service providing apparatus 300A. The generated electronic data information request is an HTTP message using the API released by the service A. Each service has a unique API for acquiring thumbnail URLs and data identification information. For this reason, the relay apparatus 200 includes programs for generating electronic data information requests according to the individual services. Specifically, the relay apparatus 200 includes the URL acquiring program for the service A for generating an electronic data information request for the service A, and the URL acquiring program for the service B for generating an electronic-data-information request for the service B. The relay apparatus 200 uses those programs to generate an electronic data information request corresponding to each service.

A type of search information stored in the generated electronic data information request depends on each service. For example, in order to search for a list of downloadable electronic data, the service provider side may need information, such as an album ID of an album, for designating the storage location of the electronic data. In this case, information, such as an album ID of an album which the user wants, for designating the storage location of the electronic data is stored as search information in the electronic data information request. Also, in order to search for the list of downloadable electronic data, the service provider side may need information, such as a folder name, for designating the storage location of the electronic data. In this case, information, such as a folder name which the user wants, for designating the storage location of the electronic data is stored as the search information in the electronic data information request.

Additional information other than the search information may be stored in the electronic data information request. For example, when the service provider side requires authentication information on the user for authenticating the user, the authentication information may be stored.

The search information and the additional information such as the authentication information are stored in the storage unit 230 in advance. The relay apparatus 200 uses necessary additional information to generate the electronic data information request according to each service.

In the above description, it has been described that the additional information necessary for the electronic data information request is stored in the relay apparatus 200 is advance. However, the present invention is not limited thereto. For example, before each time an electronic data information request is generated, the relay apparatus 200 may inquire of the multi-function device 100 about necessary additional information. When receiving the inquiry about additional information, the multi-function device 100 displays a screen for inquiring about additional information on the display unit 150 so as to enable the user to input or select additional information. Therefore, the user can designate an album ID of a desire album or a desire folder name. Then, the multi-function device 100 transmits the additional information input or selected by the user, to the relay apparatus 200. In this way, the relay apparatus 200 can designate the necessary additional information. In this case, the relay apparatus 200 generates an inquiring screen corresponding to each service in a markup language such as XML. This is because the type of additional information which the user should input or select depends on each service. The relay apparatus 200 transmits a message of the inquiring screen written in the markup language such as the XML to the multi-function device 100. The multi-function device 100 can execute rendering based on the received message so as to display the inquiring screen corresponding to the service designated by the service. If the multi-function device has at least a rendering driver of the markup language such as the XML, the multi-function device 100 can display an inquiring screen according to each service. Therefore, the user can designate an album or folder from which the user wants to download a thumbnail image, according to each service.

Next, in step D006, the service providing apparatus 300 transmits a thumbnail URL and an electronic data identification information to the relay apparatus 200 in response to the request of the relay apparatus 200. When there is a plurality of electronic data corresponding to the received electronic data information request, the service providing apparatus 300 transmits a plurality of thumbnail URLs and a plurality of electronic data information corresponding to the plurality of electronic data to the relay apparatus 200.

When receiving the thumbnail URLs and the electronic data information from the service providing apparatus 300, the relay apparatus 200 generates an XML text of a data selection screen to be displayed in the multi-function device 100 in step D007. The data selection screen is a screen for enabling the user to select an electronic data to be downloaded, in the multi-function device 100. In the data selection screen, thumbnail images of a plurality of electronic data are arranged. In the present illustrative embodiment, for example, it is assumed that 4 thumbnail images can be simultaneously displayed on the display unit 150. When the user selects a thumbnail image of a desired electronic data from the displayed thumbnail images, the electronic data corresponding to the selected thumbnail image is downloaded. The generated XML text includes 50 thumbnail URLs and electronic data identification information received from the service providing apparatus 300. In the XML, text, it is defined in advance to transmit an electronic data URL acquisition request, including an electronic data identification information corresponding to a thumbnail image, to the relay apparatus 200 when the user selects the thumbnail image.

In step D008, the relay apparatus 200 transmits a message (electronic data selection screen display request) including the XML text of the data selection screen generated in step D007 to the multi-function device 100. When receiving the XML text of the data selection screen, the multi-function device 100 executes rendering according to the XML text. At this time, in step D009, the multi-function device 100 transmits a thumbnail image request to the service providing apparatus 300 based on the thumbnail URLs included in the XML text. The thumbnail image request is specifically an HTTP message using a GET method. The thumbnail image request includes the thumbnail URLs acquired from the relay apparatus 200. A server performing communication based on HTTP should support the general GET method. Therefore, although the multi-function device 100 does not have programs for generating electronic data information requests according to the individual services, which the relay apparatus 200 has, the multi-function device 100 can download thumbnail images in each service by using the GET method which is generally used to download data. The multi-function device 100 transmits a thumbnail image request to the service providing apparatus 300 for every four thumbnail images to be displayed on the display unit 150.

When receiving the thumbnail image request, in step D010, the service providing apparatus 300 transmits thumbnail images stored in the storage locations indicated by the URLs included in the received thumbnail images screen request, to the multi-function device 100.

When receiving the thumbnail images from the service providing apparatus 300, the multi-function device 100 displays a data selection screen U002 on the display unit 150. In the data selection screen U002, the thumbnail images received from the service providing apparatus 300 are arranged. Therefore, the user can look for a desired electronic data while browsing the thumbnail images.

After displaying the data selection screen U002 (see FIG. 3), the multi-function device 100 receives a selection of an electronic data from the user. The data selection screen U002 has functions as the display unit 150 and the operation unit 180. The data selection screen U002 includes a 'Previous 50 Images' key B01, a 'Next 50 Images' key B02, a 'Previous Display Screen' key B03, a 'Next Display Screen' key B04, and an 'OK' key B05. In the data selection screen U002, four thumbnail images are displayed. When the user touches the 'Previous 50 Images' key B01, the multi-function device 100 requests thumbnail URLs corresponding to a page just before a page including the thumbnail images displayed in the current data selection screen, from the service providing apparatus 300 through the relay apparatus 200. When the user touches the 'Next 50 Images' key B02, the multi-function device 100 requests thumbnail URLs corresponding to a page just after the page including the thumbnail images displayed in the current data selection screen, from the service providing apparatus 300 through the relay apparatus 200. When the user touches the 'Previous Display Screen' key B03, the multi-function device 100 changes the thumbnail images displayed in the current data selection screen to four previous thumbnail images. When the user touches the 'Next Display Screen' key B04, the multi-function device 100 changes the thumbnail images displayed in the current data selection screen to four next thumbnail images. After the user selects an electronic data regarding a thumbnail image, the 'OK' key B05 is used to determine the selection contents.

In the data selection screen U002, thumbnail images of a ring, a tree, an exclamation mark, and an equal mark are displayed. When the user touches the 'Previous Display Screen' key B03 or the 'Next Display Screen' key B04, in step D011, the multi-function device 100 transmits a thumbnail image request for acquiring four new thumbnail images different from the thumbnail images which are being displayed. Then, when receiving the new thumbnail images in step D012, the multi-function device 100 displays the new thumbnail images on the display unit 150 (that is, the data selection screen U002 is changed to a data selection screen U201 (see FIG. 4) having the new thumbnail images displayed therein). The user can select a desired electronic data from the displayed new thumbnail images by touching a thumbnail image corresponding to the desired electronic data in the operation unit 180. The data selection screen U201 displays thumbnail images of a triangle, a wheelchair, a question mark, and a knife and fork, and shows that electronic data regarding the thumbnail images of the wheelchair and the knife and fork has been selected by the user.

When the user touches the 'Previous 50 Images' key B01 or the 'Next 50 Images' key B02 of the operation unit 180, information representing the contents of the touched key, the page which is being displayed, and the electronic data selected in the multi-function device 100 as selection information are notified to the relay apparatus 200 in step D201. In the illustrative embodiment, the electronic data regarding the thumbnail images of the wheelchair and the knife and fork are designated by the selection information. In step D201, it is assumed that the page which is being displayed on the display unit 150 is the first page, and the 'Next 50 Images' key B02 has been touched by the user.

When receiving information representing that the first page is being displayed and the 'Next 50 Images' key B02 has been touched, in step D202, the relay apparatus 200 transmits a request for acquiring electronic data information regarding electronic data registered in the second page of the album. When receiving the request for acquiring the electronic data information from the relay apparatus 200, in step D203, the service providing apparatus 300 transmits the electronic data information regarding the electronic data registered in the second page of the album, to the relay apparatus 200. Then, in step D204, the relay apparatus 200 excludes information which does not correspond to electronic data of the second page of the album, from the selection information notified in step D201, and registers the excluded information as succeeding information. The multi-function device 100 determines that a thumbnail image which is included in succeeding information is in a selected state, and a thumbnail image which is not included in the succeeding information is in an unselected state. In step S204, the relay apparatus 200 also generates an XML text of a data selection screen corresponding to the second page of the album.

Next, in step D205, the relay apparatus 200 transmits a message including the succeeding information registered in step D204, and the XML text of the data selection screen, to the multi-function device 100. In step D2051, the multi-function device 100 transmits a thumbnail image request to the service providing apparatus 300 based on the thumbnail URLs included in the received XML text. When receiving the thumbnail image request, in step D2052, the service providing apparatus 300 transmits the thumbnail images to the multi-function device 100. When receiving the thumbnail images corresponding to the second page of the album, the multi-function device 100 displays the thumbnail images corresponding to the second page of the album in a data selection screen U202 on the display unit 150.

The data selection screen U202 shows thumbnail images representing a train, a no-smoking mark, a bicycle, and a person from the left (it is determined from the data selection screen U202 that all of the thumbnail images are in the unselected state). It is assumed that the user operates the operation unit 180 so as to select the no-smoking mark, and touches the 'Previous 50 Images' key B01 (see U203). In this case, in step D206, the multi-function device 100 notifies information representing that the second page of the album is being displayed, information representing that the 'Previous 50 Images' key has been touched, selection information indicating an electronic data regarding the no-smoking mark, and the succeeding information indicating the electronic data regarding the wheelchair and the knife and fork, to the relay apparatus 200. Next, in step D207, the relay apparatus 200 transmits a request for acquiring electronic data information regarding the electronic data of the first page, which is a page just before the second page that is being displayed, of the album, to the service providing apparatus 300. Then, in step S208, the service providing apparatus 300 transmits the electronic data information regarding the electronic data of the first page of the album, to the relay apparatus 200. In step D209 (see FIG. 5), the relay apparatus 200 excludes information corresponding to electronic data not included in the first page of the album, from the selection information notified in step D206, and registers the excluded information as the succeeding information. Also, in step D209, the relay apparatus 200 generates an XML text of a data selection screen corresponding to the first page of the album.

In step D210, the relay apparatus 200 transmits a message including the selection information and the succeeding information updated in step D209 and the XML text of the data selection screen, to the multi-function device 100. Then, in step D211, the multi-function device 100 transmits a thumbnail image request to the service providing apparatus 300 based on the thumbnail URLs included in the received XML text. When receiving the thumbnail image request, in step D212, the service providing apparatus 300 transmits thumbnail images to the multi-function device 100. When receiving the thumbnail images corresponding to the first page of the album, the multi-function device 100 displays the thumbnail images in a data selection screen U204 on the display unit 150.

The data selection screen U204 shows the thumbnail images of the triangle, the wheelchair, the question mark, and the knife and fork (it is determined from the data selection screen U204 that the wheelchair and the knife and fork are in the selected state). When the user operates the operation unit 180 so as to deselect the selected wheelchair and select the triangle, and touches the 'OK' key B05 so as to determine the selection (see a data selection screen U205), in response to this user's operation, in step D213, the multi-function device 100 transmits an image data selection completion notification, selection information indicating the electronic data regarding the triangle and the knife and fork, and succeeding information indicating the no-smoking mark, to the relay apparatus 200. Then, in step D214, the relay apparatus 200 adds selection information to the succeeding information. Next, in step D215 of FIG. 6, the relay apparatus 200 transmits a request for acquiring URLs for downloading the electronic data regarding the thumbnail images included in the succeeding information, to the service providing apparatus 300. In step D216, the service providing apparatus 300 transmits information including the URLs for downloading the selected electronic data, to the relay apparatus 200. Next, in step D217, the multi-function device 100 generates an XML text necessary for downloading the electronic data from the service providing apparatus 300 based on the received information, and transmits the XML text to the multi-function device 100.

Then, the display unit 150 displays a text for starting download and printing of the electronic data (see a screen U206). When the user operates the operation unit 180 so as to instruct to start download and printing of the electronic data in step U207, the multi-function device 100 downloads the electronic data from the service providing apparatus 300 in steps D218 to D223. Then, the multi-function device 100 prints the downloaded electronic data using the print unit 160 in step D224.

<Main Process Executed by Multi-Function Device>

A main process executed by the multi-function device 100 will be described with reference to FIG. 7. In order to start the main process, the user inputs process start instruction to the multi-function device 100. Specifically, when the multi-function device 100 is a touch panel model, the user touches an application start icon. The application start icon is displayed on the display unit 150 of the multi-function device 100 in a standby state. When the multi-function device 100 has no touch panel function (hereinafter, referred to as a non-touch-panel model), the user pushes an operation button included in the operation unit 180 and is associated with the start of the main process. When the main process starts, in step S400, the control unit 120 controls the communication unit 110 to transmit application start request information for instructing the start of the main process to the relay apparatus 200. The control unit 120 stands by until receiving instruction information which the relay apparatus 200 transmits in response to step S400 (No in step S402). The control unit 120 controls the communication unit 110 so as to receive the instruction information. When receiving the instruction information (Yes in step S402), the control unit 120 determines an instruction type of the received instruction information in step S404. The received instruction information is stored in the RAM or the like included in the control unit 120.

When the instruction type included in the instruction information stored in the RAM is a function operation instruction (function operation instruction in step S404), in step S406, the control unit 120 controls at least one of the print unit 160, the scanner unit 170, the memory card controller 140, and the communication unit 110 to operate so as to execute a function corresponding to an operation type included in the function operation instruction according to a parameter which is set information. An example of the function operation instruction is a print start request (step D217). After step S404, the control unit 120 returns to the process of step S402.

Figures 10, 11:
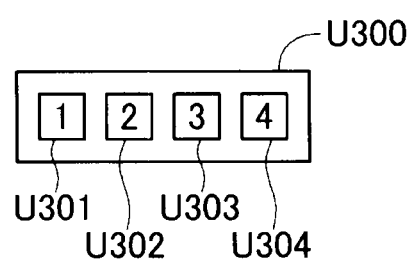
FIG. 10 is a diagram illustrating a relation between thumbnail URLs and indexes.
FIG. 11 is a diagram illustrating an image displayed on a display unit of the multi-function device.

In the meantime, when the instruction type included in the instruction information stored in the RAM is a list display instruction (list display instruction in step S404), the control unit 120 initializes an index to be described below, in step S408, and executes a screen information generating process in step S410. An example of the list display instruction is an electronic data selection screen request (steps D008, D205, and D210). In the screen information generating process, thumbnail URLs, which are notified as the instruction information by the relay apparatus 200 and are stored in the RAM, are referred to. The thumbnail URLs are stored in order, for example, as arrangement contents. The above-mentioned index is a value indicating an arrangement number of a stored thumbnail URL. A relation between the thumbnail URL and the index is shown in FIG. 10. In FIG. 10, the value of the index is 1, and indicates a corresponding first thumbnail URL of electric data. The screen information generating process executed in step S410 will be described below. After executing the screen information generating process of step S410, in step S412, the control unit 120 displays a predetermined screen on the display unit 150 in accordance with image information generated in step S410. In a case where the multi-function device 100 is a non-touch-panel model and can light hard keys included in the operation unit 180, if lighting of a hard key is instructed in the screen information, a backlight corresponding to the hard key is lit up. Since validated hard keys are shown brightly, it is possible to improve operability for the user.

After step S412, the control unit 120 determines whether any key has been operated in step S413. The control unit 120 stands by until any key is operated (No in step S413). When any key has been operated (Yes in step S413), in step S414, the control unit 120 determines whether the operated key is a screen switch operation key (for example, the 'Previous Display Screen' key B03 or the 'Next Display Screen' key B04). When the operated key is a screen switch operation key (Yes in step S414), the control unit 120 performs the screen information generating process of step S410. When the operated key is not a screen switch operation key (No in step S414), in step S416, the control unit 120 determines whether the operated key is a thumbnail selection operation key for selecting a thumbnail image (for example, a thumbnail image). When it is determined that the thumbnail selection operation key has been operated (Yes in step S416), the control unit 120 stores selection information representing which thumbnail image has been selected, in step S418, and proceeds to step S402 to wait for the instruction information. When it is not determined in step S416 that thumbnail selection operation has been performed (No in step S416), the control unit 120 stores a key type representing the type of the operated key in the RAM or the like. A key determined not to be a screen switch operation key and a thumbnail selection operation key is any one of the 'OK' key B05, the 'Previous 50 Images' key B01, and the 'Next 50 Images' key B02. In step S420, the control unit 120 generates the operation result information including the key type, the selection information, and the succeeding information. Then, in step S422, the control unit 120 controls the communication unit 110 to transmit the operation result information to the relay apparatus 200.

<Screen Information Generating Process>

Figure 8:
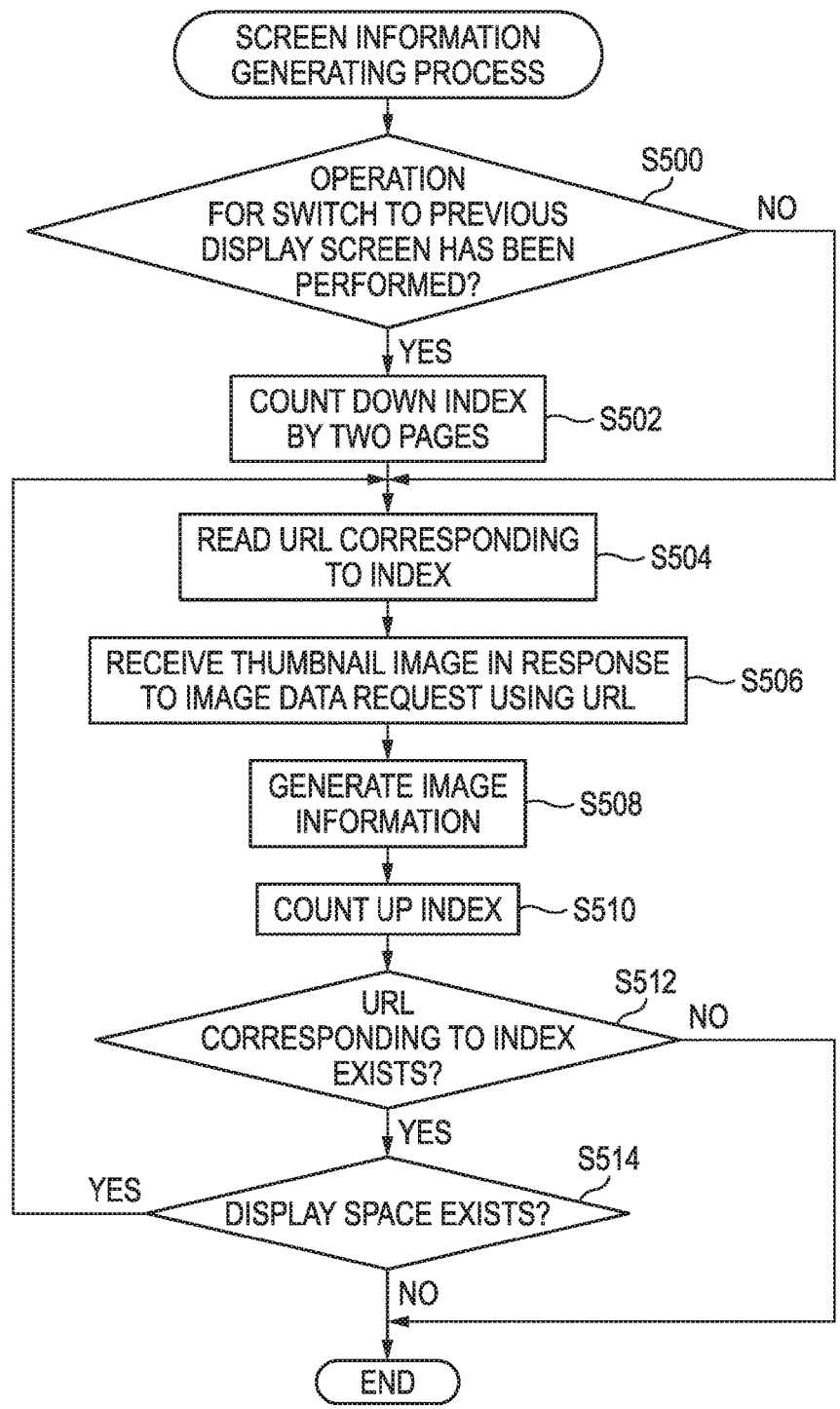
FIG. 8 is a flow chart illustrating a screen information generating process of the multi-function device.

The screen information generating process executed in step S410 of the main process shown in FIG. 7 will be described with reference to FIG. 8. First, in step S500, the control unit 120 determines whether operation for switch to the previous display screen (for example, touching of the 'Previous Display Screen' key B03) has been performed in step S413 of FIG. 7 by the user. When the operation for switch to the previous display screen has been performed in step S413 by the user (Yes in step S500), in step S502, the control unit 120 reduces (counts down) the index, which is a value indicating arrangement number of the stored thumbnail URL, by two pages. Then, the control unit 120 proceeds to step S504. When any operation for switch to the previous display image has not been performed (No in step S500), the control unit 120 proceeds to step S504.

In step S504, the control unit 120 reads a URL, indicated by the index, of the thumbnail URLs stored in the storage unit 130. Then, in step S506, the control unit 120 accesses the service providing server 300 using the read thumbnail URL through the network 400 (which corresponds to the thumbnail image request of step D011), and downloads a thumbnail image. In step S508, the control unit 120 generates image information for displaying the thumbnail image on the display unit 150, based on the template stored in the storage unit 130. The control unit 120 increases (counts up) the index in step S510. When a thumbnail URL indicated by the index does not exist (No in step S512), the screen information generating process ends. When a thumbnail URL corresponding to the index after the increase (count-up) exists (Yes in step S512), in step S514, the control unit 120 determines whether it is possible to additionally display the thumbnail image on the display unit 150, based on the template. When it is determined that it is possible to additionally display the thumbnail image (Yes in step S514), the control unit 120 proceeds to step S504. When it is determined that it is not possible to additionally display the thumbnail image (No in step S514), the screen information generating process ends. An operation regarding steps S504 to S516 will be described in detail with reference to FIG. 11 which illustrates an example of an image displayed on the display unit 150. In the present illustrative embodiment, for example, it is assumed that four thumbnail images can be simultaneously displayed on the display unit 150. A thumbnail image display section U300 includes a first thumbnail display part U301, a second thumbnail display part U302, a third thumbnail display part U303, and a fourth thumbnail display part U304. When downloading a thumbnail image from the service providing server 300, the control unit 120 of the multi-function device 100 displays the thumbnail image at the first thumbnail display part U301. Then, when downloading the next thumbnail image, the control unit 120 displays the thumbnail image at the second thumbnail display part U302. In this way, the control unit 120 controls the display unit 150 to display thumbnail images until thumbnail images are displayed at all of the first to fourth thumbnail display parts U301 to U304 (No in step S514) or there is no thumbnail image to be downloaded.

<Operation of Relay Apparatus 200>

Figure 9:
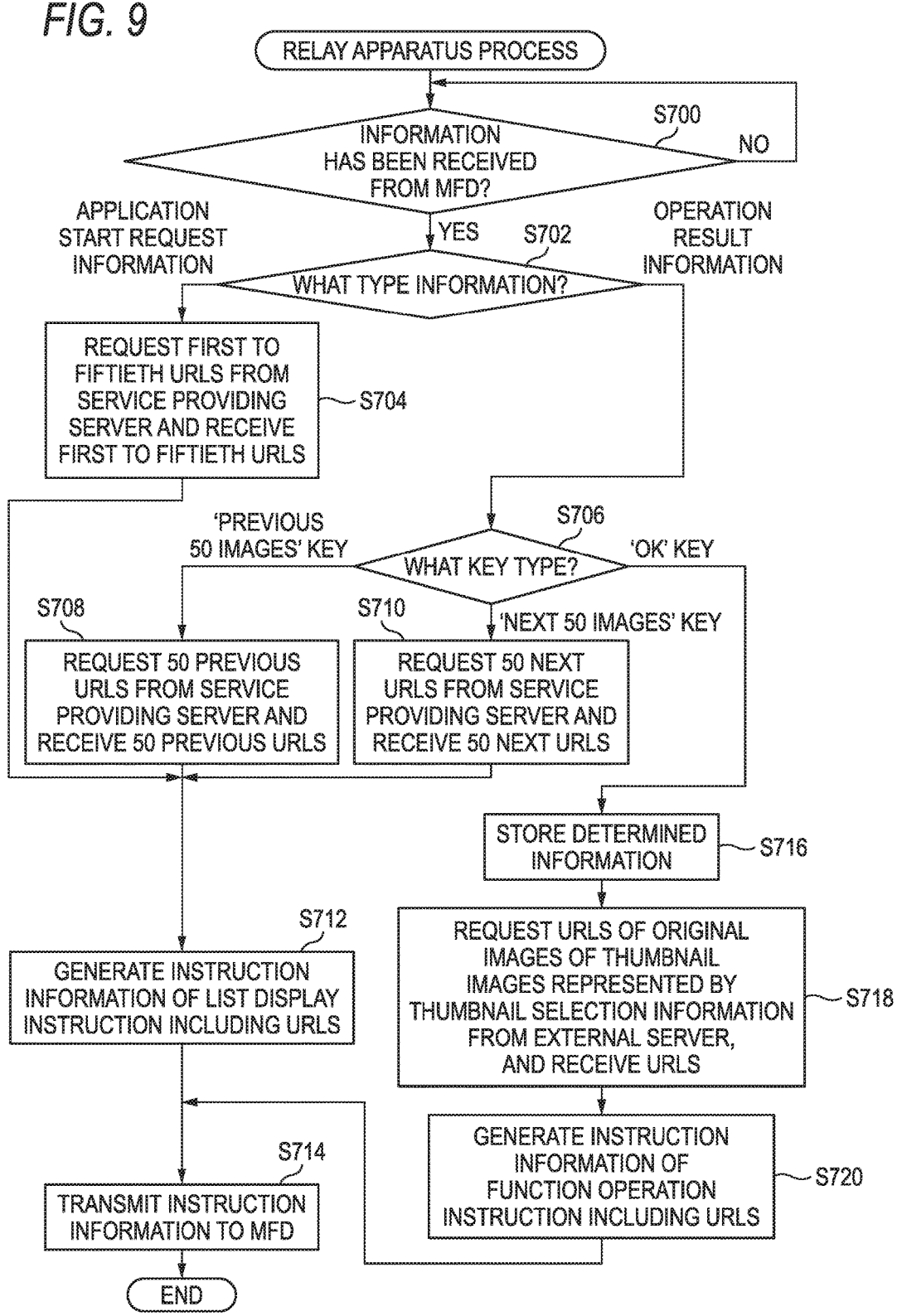
FIG. 9 is a flow chart illustrating another operation of the multi-function device.

Next, a detailed operation of the relay apparatus 200 will be described with reference to FIG. 9. When the relay program stored in the storage unit 230 runs, the control unit 220 of the relay apparatus 200 starts a relay apparatus process shown in FIG. 9 in accordance with various programs stored in the storage unit 230.

When the relay apparatus process starts, first, the control unit 220 stands by until receiving any information from the multi-function device 100 (No in step S700). When receiving any information from the multi-function device 100 (Yes in step S700), the control unit 220 determines the type of the received information in step S702. When the received information is the application start request information (application start request information in step S702), the relay apparatus 200 requests fifty thumbnail URLs from the first thumbnail URL for the thumbnail images stored in order the service providing server 300, to the service providing server 300 (which corresponds to request for acquiring electronic data information of step D005) and receives the thumbnail URLs in step S704. Then, the relay apparatus process proceeds to step S712 to be described below. When it is determined in step S702 that the received information is the operation result information (operation result information in step S702), in step S706, the relay apparatus 200 determines the key type notified as an operation result from the multi-function device 100. When the notified key type represents the 'Previous 50 Images' key ('Previous 50 Images' key in step S706), the relay apparatus 200 receives thumbnail URLs and electronic data identification information regarding electronic data of a page just before the current album page displayed in the multi-function device 100 from the service providing server 300 (which corresponds to step D207). Then, the relay apparatus process proceeds to step S712 to be described below. When the notified key type represents the 'Next 50 Images' key ('Next 50 Images' key in step S706), the relay apparatus 200 receives thumbnail URLs and electronic data identification information regarding electronic data of a page just after the current album page displayed in the multi-function device 100 from the service providing server 300 (which corresponds to step D202). Then, the relay apparatus 200 generates instruction information for issuing a list display instruction including the received thumbnail URLs in step S712 (which corresponds to steps D007, D204, and D209). Next, the relay apparatus 200 transmits the generated instruction information to the multi-function device 100 in step S714, and ends the process.

When it is determined in step S706 by the control unit 220 that the key type input in the multi-function device 100 represents the 'OK' key ('OK' key in step S706), in step S716, the selection information and the succeeding information are stored in the storage unit 230 as determined information. Then, the relay apparatus 200 requests URLs of electronic data, regarding the thumbnail images represented by the selection information, from the service providing server 300 (which corresponds to the download URL acquisition request of step D215). Then, in step S718, the relay apparatus 200 receives the URLs transmitted from the service providing server 300. Next, in step S720, the relay apparatus 200 generates the instruction information of the function operation instruction including the received URLs. Here, the function operation instruction may be an electronic data printing start request to the multi-function device 100. Next, the relay apparatus 200 transmits the instruction information to the multi-function device 100 (which corresponds to the printing start request of step D217), and ends the process.

Modified Example

Figure 12:
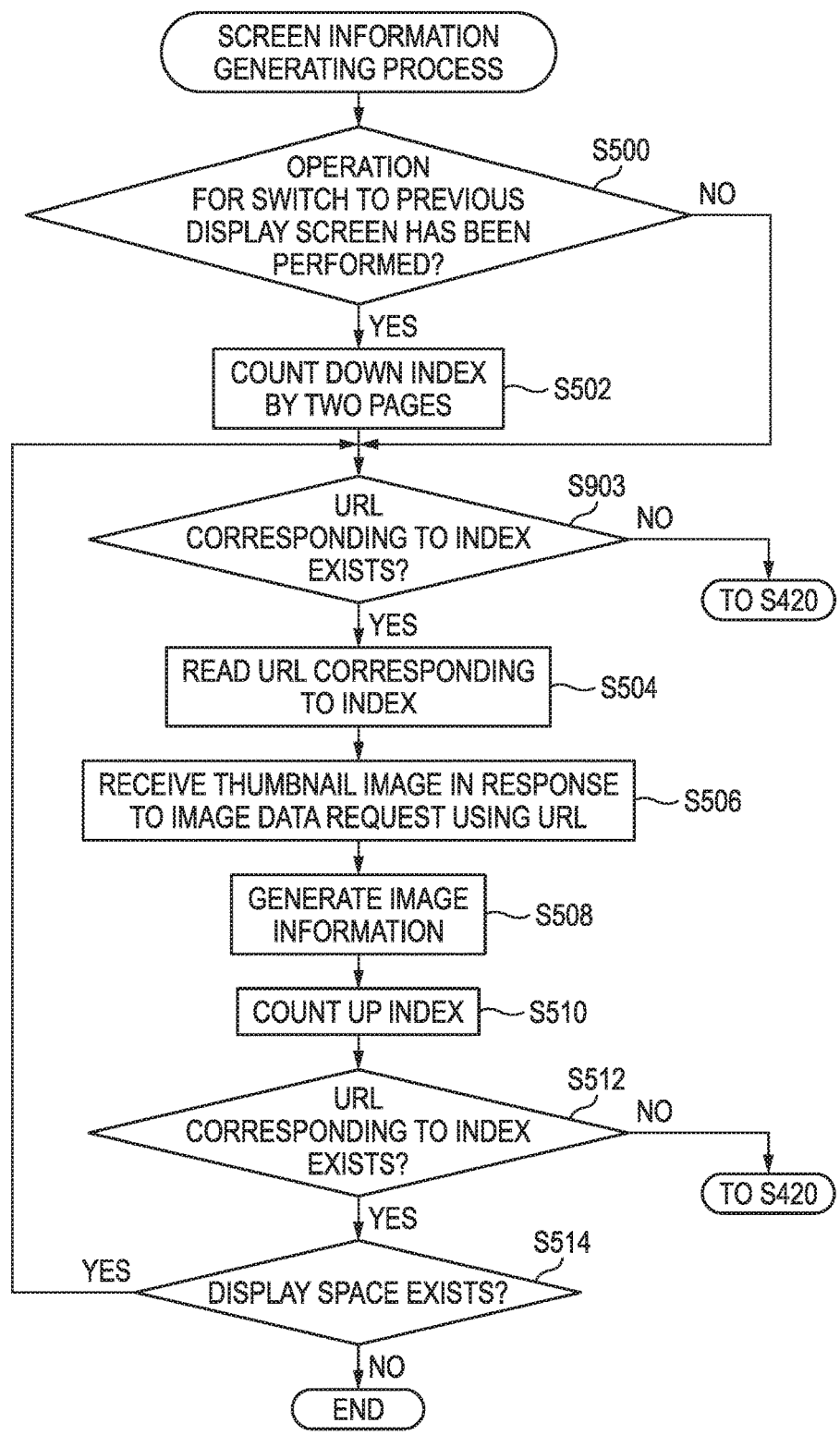
FIG. 12 is a flow chart illustrating a modified example of the screen information generating process of the multi-function device.

A modified example of the processes shown in FIGS. 8 and 9 will be described with reference to FIG. 12. In the modified example, the 'Previous 50 Images' key B01 and the 'Next 50 Images' key B02 are omitted. Also, one page is configured by 48 electronic data, not 50 electronic data. A key determined in step S416 as not being a display screen switch operation key nor a thumbnail selection operation key is only the 'OK' key B05.

In a case of No in step S502 or S500, it is determined whether a thumbnail URL corresponding to the index exists, in step S903. When a thumbnail URL corresponding to the index does not exist (No in step S903), a 'Previous 48 Images' key is stored as the key type in the RAM, and the process proceeds to step S420 (FIG. 7). When a thumbnail URL corresponding to the index exists (Yes in step S903), the process proceeds to step S504. When it is determined in step S512 that a thumbnail URL corresponding to the index does not exist (No in step S512), the 'Next 48 Images' key is stored as the key type in the RAM, and the process proceeds to step S420. When a thumbnail URL corresponding to the index after the increase (count-up) exists (Yes in step S512), the process proceeds to step S514.

That is, in the modified example, the control unit 120 determines whether a thumbnail URL corresponding to the index after the increase (count-up) or the reduction (count-down) exists, according to display screen switch operation of the user. Then, when thumbnail URL corresponding to the index after the increase (count-up) or the reduction (count-down) does not exist, the 'Previous 48 Images' key or the 'Next 48 Images' key is stored as the key type. Then, the control unit 120 notifies the stored key type of the relay apparatus 200, and acquires the thumbnail URLs corresponding to the 'Previous 48 Images' key or the 'Next 48 Images' key. These operations make it possible to perform a page switch operation without requiring the 'Previous 50 Images' key B01 and the 'Next 50 Images' key B02.

As described above, according to the service cooperation system 10, it is possible to print electric files downloaded in a desired service, and since electronic data does not pass through the relay apparatus 200, it is possible to suppress the operational cost of the relay apparatus 200.

According to the service cooperation system 10, it is possible to implement new services cooperating with the electronic-data storing service without a problem in which loads of the multi-function device 100, the electronic-data storing service, and the network between them occurs due to the process requiring download information whenever electronic data is output. Further, the business operator providing the service cooperation system 10 to the users can maintain cooperation with other services only by updating the programs, using the APIs, of the relay apparatus 200, if necessary.

While the present invention has been shown and described with reference to certain illustrative embodiments thereof, it will be understood by those skilled in the art that various changes in form and details may be made therein without departing from the spirit and scope of the invention as defined by the appended claims.

In the above-mentioned illustrative embodiment, the description has been made by using a URL as an address of a thumbnail image to be downloaded or an address of electronic data. However, the present invention is not limited thereto.

In the above-mentioned illustrative embodiment, in the relay apparatus process, the control unit 220 of the relay apparatus 200 generates the XML text of the data selection screen, and transmits the XML text of the data selection screen in step S714. However, the present invention is not limited thereto. For example, the relay apparatus 200 may transmit the entire electronic data identification information and thumbnail URLs received in each service to the multi-function device 100. In this case, the multi-function device 100 may generate a data selection screen based on the received electronic data identification information and thumbnail URLs in accordance to a predetermined program prepared by the manufacturer.

In the above-mentioned illustrative embodiment, in steps S704, S708, and S710 of the relay apparatus process, the relay apparatus 200 acquires the thumbnail URLs; however, the present invention is not limited thereto. For example, the relay apparatus 200 may acquire the data name of electronic data in place of the thumbnail URLs, and the multi-function device 100 may display the data name instead of the thumbnail URLs.

In the above-mentioned illustrative embodiment, the number of thumbnail URLs and electronic data identification information which can be downloaded at one time from the service providing apparatus 300 to the relay apparatus 200 is set to 50 such that the multi-function device 100 and the relay apparatus 200 can fully process the thumbnail URLs and the electronic data identification information.

Here, according to the specifications of the service, the amount of thumbnail URLs and electronic data identification information which can be transmitted at one time from the service providing apparatus 300 to the relay apparatus 200 may be limited. The amount of thumbnail URLs and electronic data identification information may be the number of thumbnail URLs and electronic data identification information, or the total data size of the thumbnail URLs and electronic data identification information, or the like. In this case, the amount of thumbnail URLs and electronic data identification information which the relay apparatus 200 can download from the service providing apparatus 300 at one time may be determined according to the specification of the service providing apparatus 300.

In the above-mentioned illustrative embodiment, the service regarding the service providing apparatus 300 manages data in units of albums. Here, in a case of a service such as Flickr (registered trademark) capable of registering electronic data in a form in which the electronic data do not belong to albums, in the data selection screen U001, it is possible to select an electronic data which does not belong to any album. In a case where an electronic data which does not belong to any album is selected, the multi-function device 100 requests information on the electronic data which does not belong to any album, through the relay apparatus 200.

In the above-mentioned illustrative embodiment, as information indicating a selected thumbnail image, two types of information, that is, the selection information and the succeeding information are used. However, only the succeeding information may be used, that is, electronic data regarding thumbnail images selected as the succeeding information may be registered in step S418.

The control unit 120 may be configured to generate print information for printing 4 thumbnails using thumbnail images (step S410) and to make the print unit 160 execute printing using the print information in steps S410 and S412. The control unit 120 may be configured to acquire a URL for downloading electronic data, not a thumbnail image, in step S402 (that is, the relay apparatus 200 may receive a URL for downloading electronic data, not a thumbnail image, from the service providing server 300 in steps S704, S708, and S710, and transmit the URL to the multi-function device 100 in step S714), generate print information for printing 4 electronic data using the electronic data (step S410), and to make the print unit 160 execute printing using the print information (this case becomes an illustrative embodiment in which electronic data of an album is printed without displaying thumbnail images in the multi-function device 100).

What is claimed is:

1. A printing system comprising a printer and a printer vendor server,
    wherein the printer vendor server is configured to be:
        provided by a printer vendor and accessible through the Internet;
        accessed from printers through the Internet; and
        available of utilizing APIs provided from each service provider server and released on the Internet,
            the service provider server configured to be provided by a service provider and to be accessible through the Internet, each service provider server releasing a unique API,
            the service provider server being capable of storing image data in volume uploaded through the Internet from a terminal device including a web browser with utilizing an API, and
            the service provider server being capable of allowing a terminal device to download stored image data according to a request from a terminal device including a web browser with utilizing an API,
    wherein the printer vendor server is configured to:
        receive a first request for obtaining image data selection screen data from any one of the printers through the Internet,
            the first request being a request for displaying a server selection screen for selecting a service provider server on a display of a printer and being a request of a service provider server that a printer selected through a user interface of a printer transmits to a printer vendor server through the Internet, and
            the first request being a request for designating a service provider server selected through a user interface of a printer out of the service provider servers,
    wherein the printer vendor server is configured to:
        receive a thumbnail ID identifying a thumbnail of image data with utilizing an API provided from a service provider server with respect to each image data stored in the service provider server designated in the first request;
        generate image data selection screen data including the received thumbnail ID; and
        transmit the generated image data selection screen data to a printer that transmits the first request,
            the image data selection screen data being data for displaying image data selection screen on a printer,
                the image data selection screen being a screen displayed on a display of a printer for selecting any of image data stored in the service provider servers,
            the image data selection screen data including a thumbnail ID of image data for one page and an image data ID for one page within high volume image data stored in the service provider server, in a case where the service provider server stores image data in volume that is larger than image data for one page,
                the thumbnail ID being an ID identifying a thumbnail of image data, and
                the image data ID being an ID identifying image data,
    wherein the printer being capable of receiving thumbnail ID for one page at maximum and image data ID due to onetime transmission of image data selection screen data from the printer vendor server,
    wherein the printer is configured to:
        display a server selection screen for selecting a service provider server on a display of the printer;
        transmit the first request designating a service provider server selected through the user interface of the printer to a printer vendor server through the Internet;
        receive image data selection screen data including a thumbnail ID of image data for one page and an image data ID for one page from a printer vendor server to which the first request is transmitted;
        receive thumbnail data of image data from a service provider server through the Internet with utilizing a thumbnail ID included in the received image data selection screen data; and display a image data selection screen including a thumbnail indicated by the received thumbnail data on a display of the printer according to the received image data selection screen data,
the image data selection screen includes a screenful of thumbnail,
the printer being capable of displaying thumbnail for a screenful at maximum within thumbnail for one page, and
the image data selection screen including a next instruction object for instructing to display a next page subsequent to a page displayed on the image data selection screen,
wherein the printer vendor server is configured to:
in a case of receiving a second request through the Internet from the printer to which the image data selection screen data is transmitted, generate image data selection screen data of a next page subsequent to image data selection screen data that is already transmitted to a printer,
the second request being a request that is transmitted in a case where a printer to which image data selection screen data is transmitted receives an operation of the next instruction object included in an image data selection screen through an user interface of the printer in a state of displaying the image data selection screen,
the second request being a request for requesting image data selection screen data of a next page subsequent to a page displayed on an image data selection screen when a printer receives an operation of a next instruction object,
newly generated image data selection screen data including a thumbnail ID received with utilizing an API provided from a service provider server designated by the first request, and
a thumbnail ID and an image data ID included in the newly generated image data selection screen data are a thumbnail ID and an image data ID of a next page subsequent to a page displayed on an image data selection screen when a printer receives an operation of a next instruction object, within image data stored in the service provider server designated by the first request; and
transmit the newly generated image data selection screen data to a printer that transmits the second request,
wherein the printer is configured to:
transmit the second request to a printer vendor server through the Internet in a case of receiving an operation of a next instruction object included in an image data selection screen through a user interface of the printer in a state of displaying the image data selection screen;
receive image data selection screen data of a next page subsequent to a page displayed on an image data selection screen when the printer receives an operation of a next instruction object,
the image data selection screen data of the next page including a thumbnail ID and an image data ID for next one page of image data subsequent to a page displayed on an image data selection screen;
receive thumbnail data of image data from a service provider server through the Internet with utilizing the thumbnail ID included in the newly received image data selection screen data; and newly display a new image data selection screen including a thumbnail indicated by the received thumbnail data on a display of the printer according to the received image data selection screen data,
the new image data selection screen including a screenful of thumbnail,
the printer being capable of displaying a screenful at maximum of thumbnail on a display within next one page of thumbnail, and
the new image data selection screen including a next instruction object for instructing to display a next page subsequent to a page displayed on the new image data selection screen,
wherein the printer vendor server is configured to:
in a case of receiving a third request through the Internet from a printer to which image data selection screen data is transmitted, transmit a request for downloading image data identified by an image data ID included in the third request to a service provider server through the Internet, with utilizing an API provided from a service provider server storing image data indicated by an image data ID included the received third request,
the third request being a request that is transmitted in a case of receiving an operation of selecting any of thumbnails included in an image data selection screen thorough a user interface of a printer, in a state where a printer to which image data selection screen data is transmitted displays an image data selection screen, and being a request of a download printing of image data corresponding to a selected thumbnail,
the third request including an image data ID of image data corresponding to the selected thumbnail, and
the printer printing image data downloaded from a service provider server under a requirement that the printer vendor server requests to a service provider server, and
wherein the printer is configured to:
transmit the third request for requesting to download-print image data corresponding to a selected thumbnail to a printer vender server that transmits image data selection screen data through the Internet, in a case of receiving an operation for selecting any of thumbnails included in an image data selection screen, in a state of displaying the image data selection screen,
the third request including an image data ID of image data corresponding to a selected thumbnail,
a printer vendor server receiving the third request that transmits a request for downloading image data identified by an image data included in the third request to a service provider server through the Internet, with utilizing an API provided from a service provider server storing image data indicated by an image data ID included in the received third request, and
the printer printing image data downloaded from a service provider server under a requirement that the printer vendor server requests to a service provider server.

2. The printing system according to claim 1, wherein the print vendor server is configured to:
receive a first request designating a service provider server selected within a plurality of service provider servers through a user interface of a printer and a group selected within a plurality of groups stored in the service provider server through the user interface of the printer,
   the group being a set of several image data within a plurality of image data stored in the service provider server;
in a case where the image data included in the group designated by the first request within image data stored in the service provider server is image data in volume that is larger than the number for one page, generate image data selection screen data including thumbnail ID of image data for one page and image data ID for one page within image data in volume included in a group designated by the first request;
transmit the generated image data selection screen data to the printer to which the first request is transmitted through the Internet;
in a case of receiving the second request through the Internet from a printer to which the image data selection screen data is transmitted, newly generate image data selection screen data including thumbnail ID and image data ID of a next page subsequent to the thumbnail ID and the image data ID included in the image data selection image data already transmitted to the printer within image data included a group designated by the first request out of image data stored in the service provider server; and
transmit the generated image data selection screen data through the Internet to a printer from which the second request is transmitted.

3. The printing system according to claim 2,
wherein the group designated by the first request is an album.

4. The printing system according to claim 1,
wherein the printer vendor server is configured to:
   in a case of receiving the first request, receive thumbnail ID and image data ID with utilizing an API provided from the service provider server for each image data stored in the service provider server designated by the first request;
   generate image data selection screen data including the received thumbnail ID and the received image data ID; and
   transmit the generated image data selection screen data to the printer from which the first request is transmitted,
      image data selection screen data newly generated by the printer vendor server in a case of receiving the second request through the Internet from the printer to which the image data selection screen data including thumbnail ID and image data ID that the printer vender server receives with utilizing an API provided from the service provider server designated by the first request.

5. The printing system according to claim 1,
wherein the printer vendor service is configured to:
   in a case of receiving the first request, generate text data including thumbnail ID of image data for one page and image data ID for one page within image data in volume stored in the service provider server;
   generate image data selection screen data including the generated text data; and
   transmit the generated image data selection screen data through the Internet to the printer from which the first request is transmitted,
wherein the printer is configured to:
   in a case of receiving image data selection screen data, analyze the text data included in the received image data selection screen data to obtain thumbnail ID and image data ID included in the text data;
   receive thumbnail data of image data from the service provider server through the Internet with utilizing the thumbnail ID obtained from the text data;
   display image data selection screen including thumbnail indicated by the received thumbnail data in accordance with the received image data selection screen data on a display of the printer; and
   correspond thumbnail included the image data selection screen to image dada ID obtained from the text data,
wherein the printer vender server is configured to:
   in a case of receiving the second request through the Internet from the printer to which the image data selection screen data is transmitted, newly generate text data including thumbnail ID and image data ID of a next page subsequent to thumbnail ID and image data ID included in the image data selection screen data already transmitted to the printer;
   newly generate image data selection screen data including the newly generated text data; and
   transmit the generated image data selection screen data to the printer from which the second request is transmitted, and
wherein the printer is configured to:
   in a case of receiving an operation for selecting any of thumbnails included in the image data selection screen through a user interface of the printer in a state where the image data selection screen is displayed, transmit a third request of requesting a download print of image data corresponding to the selected thumbnail through the Internet to the printer vendor server from which the image data selection screen data is transmitted,
      the third request including image data ID corresponding to the selected thumbnail within image data ID extracted from text data included in the image data selection screen data.

6. The printing system according to claim 1,
wherein the printer is configured to:
   in a case of receiving image data selection screen data of a next page from a printer vendor server to which the a second request is transmitted after transmitting the second request, display new image data selection screen including a previous instruction object for instructing to display image data selection screen when an operation of a next instruction object is received, and the next instruction object;
   in a case of receiving an operation of the previous instruction object included in the image data selection screen through a user interface of the printer in a state where the image data selection screen is displayed, transmit a fourth request through the Internet to the printer vendor server;
   receive image data selection screen data of a previous page prior to a page displayed on the image data selection screen when an operation of the previous instruction object is received, from the printer vendor server to which the fourth request is transmitted, the image data selection screen data of the previous page including thumbnail ID of image data for one previous page prior to the page displayed on the image data selection screen and image data ID for the previous one page;

receive thumbnail data of image data through the Internet from the service provider server with utilizing thumbnail ID included in the newly received image data selection screen data; and display new image data selection screen including thumbnail indicated by the received thumbnail data on a display of the printer in accordance with the received image data selection screen data, the new image data selection screen including a screenful of thumbnail, the printer being capable of displaying thumbnail for a screenful at a maximum within thumbnail for the previous one page, and the new image data selection screen including the previous instruction object and the next instruction object, and wherein the printer vendor server is configured to:
in a case of receiving the fourth request through the Internet from the printer to which the image data selection screen data is transmitted, newly generate image data selection screen data of the previous page prior to a page of the image data selection screen data already transmitted to the printer, the fourth request being a request transmitted in a case where the printer to which the image data selection screen data is transmitted receives an operation of the previous instruction object included in the image data selection screen through a user interface of the printer in a state where the image data selection screen is displayed, the fourth request being a request of requesting image data selection screen data of the previous page prior to a page displayed on the image data selection screen when the printer receives an operation of the previous instruction objection, the newly generated image data selection screen data including thumbnail ID received with utilizing an API provided from the service provider server designated by the first request, and thumbnail ID and image data ID included in the newly generated image data selection screen data are thumbnail ID and image data ID of the previous page prior to a page displayed on the image data selection screen when the printer receives the previous instruction object within image data stored in the service provider server designated by the first request; and transmit the newly generated image data selection screen data to the printer from which the fourth request is transmitted.

7. A printer vendor server being:
provided by a printer vendor and accessible through the Internet;
accessed from printers through the Internet; and
available of utilizing APIs provided from each service provider server and released on the Internet,
the service provider server configured to be provided by a service provider and to be accessible through the Internet, each service provider server releasing a unique API, the service provider server being capable of storing image data in volume uploaded through the Internet from a terminal device including a web browser with utilizing an API, and the service provider server being capable of allowing a terminal device to download stored image data according to a request from a terminal device including a web browser with utilizing an API, wherein the printer vendor server is configured to:
receive a first request for obtaining image data selection screen data from any one of the printers through the Internet, the first request being a request for displaying a server selection screen for selecting a service provider server on a display of a printer and being a request of a service provider server that a printer selected through a user interface of a printer transmits to a printer vendor server through the Internet, and the first request being a request for designating a service provider server selected through a user interface of a printer out of the service provider servers, wherein the printer vendor server is configured to:
receive a thumbnail ID identifying a thumbnail of image data with utilizing an API provided from a service provider server with respect to each image data stored in the service provider server designated in the first request;

generate image data selection screen data including the received thumbnail ID; and transmit the generated image data selection screen data to a printer that transmits the first request, the image data selection screen data being data for displaying image data selection screen on a printer, the image data selection screen being a screen displayed on a display of a printer for selecting any of image data stored in the service provider servers, and the image data selection screen data including a thumbnail ID of image data for one page and an image data ID for one page within high volume image data stored in the service provider server, in a case where the service provider server stores image data in volume that is larger than image data for one page, the thumbnail ID being an ID identifying a thumbnail of image data, and the image data ID being an ID identifying image data, wherein the printer vendor server is configured to:
in a case of receiving a second request through the Internet from the printer to which the image data selection screen data is transmitted, generate image data selection screen data of a next page subsequent to image data selection screen data that is already transmitted to a printer, the second request being a request that is transmitted in a case where a printer to which image data selection screen data is transmitted receives an operation of the next instruction object included in an image data selection screen through an user interface of the printer in a state of displaying the image data selection screen, the second request being a request for requesting image data selection screen data of a next page subsequent to a page displayed on an image data selection screen when a printer receives an operation of a next instruction object, newly generated image data selection screen data including a thumbnail ID received with utilizing an API provided from a service provider server designated by the first request, and a thumbnail ID and an image data ID included in the newly generated image data selection screen data are a thumbnail ID and an image data ID of a next page subsequent to a page displayed on an image data selection screen when a printer receives an operation of a next instruction object, within image data stored in the service provider server designated by the first request; and transmit the newly generated image data selection screen data to a printer that transmits the second request, and wherein the printer vendor server is configured to:

in a case of receiving a third request through the Internet from a printer to which image data selection screen data is transmitted, transmit a request for downloading image data identified by an image data ID included in the third request to a service provider server through the Internet, with utilizing an API provided from a service provider server storing image data indicated by an image data ID included the received third request, the third request being a request that is transmitted in a case of receiving an operation of selecting any of thumbnails included in an image data selection screen thorough a user interface of a printer, in a state where a printer to which image data selection screen data is transmitted displays an image data selection screen, and being a request of a download printing of image data corresponding to a selected thumbnail, the third request including an image data ID of image data corresponding to the selected thumbnail, and the printer printing image data downloaded from a service provider server under a requirement that the printer vendor server requests to a service provider server.

8. The printer vendor server according to claim 7, wherein the print vendor server is configured to:

receive a first request designating a service provider server selected within a plurality of service provider servers through a user interface of a printer and a group selected within a plurality of groups stored in the service provider server through the user interface of the printer, the group being a set of several image data within a plurality of image data stored in the service provider server;

in a case where the image data included in the group designated by the first request within image data stored in the service provider server is image data in volume that is larger than the number for one page, generate image data selection screen data including thumbnail ID of image data for one page and image data ID for one page within image data in volume included in a group designated by the first request;

transmit the generated image data selection screen data to the printer to which the first request is transmitted through the Internet;

in a case of receiving the second request through the Internet from a printer to which the image data selection screen data is transmitted, newly generate image data selection screen data including thumbnail ID and image data ID of a next page subsequent to the thumbnail ID and the image data ID included in the image data selection image data already transmitted to the printer within image data included a group designated by the first request out of image data stored in the service provider server; and transmit the generated image data selection screen data through the Internet to a printer from which the second request is transmitted.

9. The printer vendor server according to claim 8, wherein the group designated by the first request is an album.

10. The printer vendor server according to claim 7, wherein the printer vendor server is configured to:

in a case of receiving the first request, receive thumbnail ID and image data ID with utilizing an API provided from the service provider server for each image data stored in the service provider server designated by the first request;

generate image data selection screen data including the received thumbnail ID and the received image data ID; and transmit the generated image data selection screen data to the printer from which the first request is transmitted, image data selection screen data newly generated by the printer vendor server in a case of receiving the second request through the Internet from the printer to which the image data selection screen data including thumbnail ID and image data ID that the printer vender server receives with utilizing an API provided from the service provider server designated by the first request.

11. The printer vendor server according to claim 7, wherein the printer vendor service is configured to:

in a case of receiving the first request, generate text data including thumbnail ID of image data for one page and image data ID for one page within image data in volume stored in the service provider server;

generate image data selection screen data including the generated text data; and transmit the generated image data selection screen data through the Internet to the printer from which the first request is transmitted, and wherein the printer vender server is configured to:

in a case of receiving the second request through the Internet from the printer to which the image data selection screen data is transmitted, newly generate text data including thumbnail ID and image data ID of a next page subsequent to thumbnail ID and image data ID included in the image data selection screen data already transmitted to the printer;

newly generate image data selection screen data including the newly generated text data; and transmit the generated image data selection screen data to the printer from which the second request is transmitted.

12. The printer vendor server according to claim 7, wherein the printer vendor server is configured to:

in a case of receiving a fourth request through the Internet from the printer to which the image data selection screen data is transmitted, newly generate image data selection screen data of the previous page prior to a page of the image data selection screen data already transmitted to the printer, the fourth request being a request transmitted in a case where the printer to which the image data selection screen data is transmitted receives an operation of the previous instruction object included in the image data selection screen through a user interface of the printer in a state where the image data selection screen is displayed, the fourth request being a request of requesting image data selection screen data of the previous page prior to a page displayed on the image data selection screen when the printer receives an operation of the previous instruction objection, the newly generated image data selection screen data including thumbnail ID received with utilizing an API provided from the service provider server designated by the first request, and thumbnail ID and image data ID included in the newly generated image data selection screen data are thumbnail ID and image data ID of the previous page prior to a page displayed on the image data selection screen when the printer receives the previous instruction object within image data stored in the service provider server designated by the first request; and transmit the newly generated image data selection screen data to the printer from which the fourth request is transmitted.

13. A printer being capable of receiving thumbnail ID for one page at maximum and image data ID due to onetime transmission of image data selection screen data from a the printer vendor server provided by a printer vendor and accessible through the Internet, wherein the printer is configured to:

display a server selection screen for selecting a service provider server on a display of the printer;

transmit the first request designating a service provider server selected through the user interface of the printer to a printer vendor server through the Internet;

receive image data selection screen data including a thumbnail ID of image data for one page and an image data ID for one page from a printer vendor server to which the first request is transmitted;

receive thumbnail data of image data from a service provider server through the Internet with utilizing a thumbnail ID included in the received image data selection screen data; and display a image data selection screen including a thumbnail indicated by the received thumbnail data on a display of the printer according to the received image data selection screen data, the image data selection screen includes a screenful of thumbnail, the printer being capable of displaying thumbnail for a screenful at maximum within thumbnail for one page, and the image data selection screen including a next instruction object for instructing to display a next page subsequent to a page displayed on the image data selection screen, the service provider server configured to be provided by a service provider and to be accessible through the Internet, each service provider server releasing a unique API, the service provider server being capable of storing image data in volume uploaded through the Internet from a terminal device including a web browser with utilizing an API, and the service provider server being capable of allowing a terminal device to download stored image data according to a request from a terminal device including a web browser with utilizing an API, wherein the printer is configured to:

transmit the second request to a printer vendor server through the Internet in a case of receiving an operation of a next instruction object included in an image data selection screen through a user interface of the printer in a state of displaying the image data selection screen;

receive image data selection screen data of a next page subsequent to a page displayed on an image data selection screen when the printer receives an operation of a next instruction object, the image data selection screen data of the next page including a thumbnail ID and an image data ID for next one page of image data subsequent to a page displayed on an image data selection screen;

receive thumbnail data of image data from a service provider server through the Internet with utilizing the thumbnail ID included in the newly received image data selection screen data; and newly display a new image data selection screen including a thumbnail indicated by the received thumbnail data on a display of the printer according to the received image data selection screen data, the new image data selection screen including a screenful of thumbnail, the printer being capable of displaying a screenful at maximum of thumbnail on a display within next one page of thumbnail, and the new image data selection screen including a next instruction object for instructing to display a next page subsequent to a page displayed on the new image data selection screen, and wherein the printer is configured to:

transmit the third request for requesting to download-print image data corresponding to a selected thumbnail to a printer vender server that transmits image data selection screen data through the Internet, in a case of receiving an operation for selecting any of thumbnails included in an image data selection screen, in a state of displaying the image data selection screen, the third request including an image data ID of image data corresponding to a selected thumbnail, a printer vendor server receiving the third request that transmits a request for downloading image data identified by an image data included in the third request to a service provider server through the Internet, with utilizing an API provided from a service provider server storing image data indicated by an image data ID included in the received third request, and the printer printing image data downloaded from a service provider server under a requirement that the printer vendor server requests to a service provider server.

14. The printer according to claim 13, wherein the printer is configured to:

in a case of receiving image data selection screen data, analyze the text data included in the received image data selection screen data to obtain thumbnail ID and image data ID included in the text data;

receive thumbnail data of image data from the service provider server through the Internet with utilizing the thumbnail ID obtained from the text data;

display image data selection screen including thumbnail indicated by the received thumbnail data in accordance with the received image data selection screen data on a display of the printer; and correspond thumbnail included the image data selection screen to image dada ID obtained from the text data, and wherein the printer is configured to:

in a case of receiving an operation for selecting any of thumbnails included in the image data selection screen through a user interface of the printer in a state where the image data selection screen is displayed, transmit a third request of requesting a download print of image data corresponding to the selected thumbnail through the Internet to the printer vendor server from which the image data selection screen data is transmitted, the third request including image data ID corresponding to the selected thumbnail within image data ID extracted from text data included in the image data selection screen data.

15. The printer according to claim 13, wherein the printer is configured to:

in a case of receiving image data selection screen data of a next page from a printer vendor server to which the a second request is transmitted after transmitting the second request, display new image data selection screen including a previous instruction object for instructing to display image data selection screen when an operation of a next instruction object is received, and the next instruction object;

in a case of receiving an operation of the previous instruction object included in the image data selection screen through a user interface of the printer in a state where the image data selection screen is displayed, transmit a fourth request through the Internet to the printer vendor server;

receive image data selection screen data of a previous page prior to a page displayed on the image data selection screen when an operation of the previous instruction object is received, from the printer vendor server to which the fourth request is transmitted, the image data selection screen data of the previous page including thumbnail ID of image data for one previous page prior to the page displayed on the image data selection screen and image data ID for the previous one page;

receive thumbnail data of image data through the Internet from the service provider server with utilizing thumbnail ID included in the newly received image data selection screen data; and display new image data selection screen including thumbnail indicated by the received thumbnail data on a display of the printer in accordance with the received image data selection screen data, the new image data selection screen including a screenful of thumbnail, the printer being capable of displaying thumbnail for a screenful at a maximum within thumbnail for the previous one page, and the new image data selection screen including the previous instruction object and the next instruction object.

* * * * *